US006640023B2

(12) United States Patent
Miller et al.

(10) Patent No.: US 6,640,023 B2
(45) Date of Patent: Oct. 28, 2003

(54) SINGLE CHIP OPTICAL CROSS CONNECT

(75) Inventors: Samuel Lee Miller, Albuquerque, NM (US); Paul Jackson McWhorter, Albuquerque, NM (US); Murray Steven Rodgers, Albuquerque, NM (US); Stephen Matthew Barnes, Albuquerque, NM (US); Jeffry Joseph Sniegowski, Edgewood, NM (US)

(73) Assignee: MEMX, Inc., Albuquerque, NM (US)

( * ) Notice: Subject to any disclaimer, the term of this patent is extended or adjusted under 35 U.S.C. 154(b) by 0 days.

(21) Appl. No.: 09/966,966

(22) Filed: Sep. 27, 2001

(65) Prior Publication Data

US 2003/0059153 A1 Mar. 27, 2003

(51) Int. Cl.[7] .................................................. G02B 6/35
(52) U.S. Cl. .............................. 385/17; 385/18; 385/16
(58) Field of Search ............................ 385/16, 17, 18

(56) References Cited

U.S. PATENT DOCUMENTS

| | | | |
|---|---|---|---|
| 3,990,780 A | 11/1976 | Dakss | 350/96 |
| 4,208,094 A | 6/1980 | Tomlinson, III et al. | 350/96.2 |
| 4,365,863 A | 12/1982 | Broussaud | 350/96.15 |
| 4,838,631 A | 6/1989 | Chande et al. | 350/6.6 |
| 5,583,688 A | 12/1996 | Hornbeck | 359/291 |
| 5,600,383 A | 2/1997 | Hornbeck | 348/771 |
| 5,783,340 A | 7/1998 | Farino et al. | 430/22 |
| 5,798,283 A | 8/1998 | Montague et al. | 438/24 |
| 5,804,084 A | 9/1998 | Nasby et al. | 216/2 |
| 5,867,302 A | 2/1999 | Fleming | 359/291 |
| 5,875,271 A | 2/1999 | Laughlin | 385/16 |
| 5,959,375 A | 9/1999 | Garcia | 310/40 |
| 5,960,132 A | 9/1999 | Lin | 385/18 |
| 5,986,381 A | 11/1999 | Hoen et al. | 310/309 |
| 6,082,208 A | 7/2000 | Rodgers et al. | 74/406 |
| 6,097,859 A * | 8/2000 | Solgaard et al. | 385/17 |
| 6,133,670 A | 10/2000 | Rodgers et al. | 310/309 |
| 6,175,170 B1 | 1/2001 | Kota et al. | 310/40 |

(List continued on next page.)

FOREIGN PATENT DOCUMENTS

| | | |
|---|---|---|
| JP | 2617054 | 6/1997 |
| WO | WO 99/66354 | 12/1999 |

OTHER PUBLICATIONS

Lucent Technologies Wave Star Lambdarouter Brochure, 2000, 6 Pages.

Primary Examiner—John D. Lee
Assistant Examiner—Daniel Valencia
(74) Attorney, Agent, or Firm—Marsh Fischmann & Breyfogle LLP

(57) ABSTRACT

The present invention provides a free space optical cross connect for switching optical signals between a plurality of optical signal ports to/from the switch interface. In one embodiment, a single chip 2N OXC (10) for switching optical signals (12) between any one of N input optical fibers (14) and any one of N output optical fibers (16) within a compact free space switch interface (18) includes N reflective microstructures (20) built/assembled on a substrate (30) and N positioning systems (40) associated with the reflective microstructures (20) that are also built/assembled on the substrate (30). The positioning systems (40) are operable to both elevate their associated reflective microstructures (20) from the surface of the substrate (30) and to tilt their associated reflective microstructures (20) with at least two degrees of freedom with respect to the surface of the substrate (30) in order to reflect optical signal (12) through the switch interface (18) from any one of the input optical fibers (14) to any one of the output optical fibers (16). The single chip 2N OXC (10) may also include a lid (62) overlying and spaced away from the substrate (30) to provide a hermetically sealed package (60).

74 Claims, 15 Drawing Sheets

U.S. PATENT DOCUMENTS

| | | | |
|---|---|---|---|
| 6,201,629 B1 | 3/2001 | McClelland et al. | 359/223 |
| 6,211,599 B1 | 4/2001 | Barnes et al. | 310/309 |
| 6,253,001 B1 * | 6/2001 | Hoen | 385/16 |
| 6,289,145 B1 | 9/2001 | Solgaard et al. | 385/17 |
| 6,310,339 B1 | 10/2001 | Hsu et al. | 250/214.1 |
| 6,327,398 B1 | 12/2001 | Solgaard et al. | 385/18 |
| 6,466,711 B1 | 10/2002 | Laor et al. | 385/18 |
| 6,483,962 B1 * | 11/2002 | Novotny | 385/18 |
| 2001/0048265 A1 | 12/2001 | Miller et al. | 310/309 |
| 2001/0051015 A1 * | 12/2001 | Gutierrez et al. | 385/17 |
| 2002/0044718 A1 * | 4/2002 | Nishi et al. | 385/17 |
| 2002/0076138 A1 * | 6/2002 | Tew | 385/18 |
| 2002/0122619 A1 * | 9/2002 | Sandler et al. | 385/17 |
| 2002/0164113 A1 * | 11/2002 | Rensing et al. | 385/18 |
| 2003/0012488 A1 * | 1/2003 | Staple et al. | 385/18 |

\* cited by examiner

SINGLE CHIP OPTICAL CROSS CONNECT

FIELD OF THE INVENTION

The present invention relates generally to the field of optical switches, and more particularly to reflective-type optical switches for switching optical signals between any pair of optical ports to/from the switch interface.

BACKGROUND OF THE INVENTION

With the increasing use of optical signals in telecommunications networks, the demand for high-bandwidth capable optical switches that can quickly route the optical signals along desired optical paths has increased. One type of optical switch converts an optical signal received on one optical port (e.g., an optical fiber end) to the switch interface to an electrical signal, switches the signal electronically, and re-converts the electrical signal to an optical signal output on a desired optical port (e.g., another optical fiber end) from the switch interface. Such optical switches are known as Optical Electrical Optical (OEO) switches. As may be appreciated, the bandwidth and switching speed capabilities of an OEO switch may be limited by the initial optical-to-electrical and subsequent electrical-to-optical signal conversions that are required.

A different approach to the switching of optical signals is known that overcomes the limitations of OEOs by switching the signals in the optical domain eliminating the optical-to-electrical and electrical-to-optical signal conversions. Such all optical switches are known in the art as Optical Cross Connect (OXC) switches. One type of OXC utilizes moveable reflectors (e.g., mirrors) to provide for the switching of optical signals within the free-space of the switch interface (i.e. without optical fibers, waveguides or the like). Typically such switches employ at least a pair of reflectors that are moved to respective orientations in order to provide an optical pathway within the free-space of the switch interface between any one of a plurality of input ports to the switch interface and any one of a plurality of output ports from the switch interface. As may be appreciated, an important parameter of such reflective-type free-space OXCs is the length of the path that an optical signal must traverse in order pass from one of the input ports to one of the output ports. Another parameter of importance to such reflective-type free space OXCs includes the proximity of the optical inputs and outputs to the reflectors, because as the distance between the reflectors and the inputs and outputs increases, there is less tolerance to alignment inaccuracies between the reflectors and the inputs and outputs.

SUMMARY OF THE INVENTION

Accordingly, the present invention provides a free-space optical cross connect for switching optical signals between optical signal ports to/from the switch interface. The optical cross connect of the present invention provides a compact switch wherein all of the moveable reflectors are supported on a single substrate. Having all of the reflectors supported on a single substrate provides for a minimal optical path length between a given pair of optical ports, and also permits the optical ports to be located in very close proximity to the reflectors. Having all of the reflectors on a single substrate also achieves advantages in the complexity of switch construction as it is not required that multiple substrates be properly oriented within the switch interface.

According to one aspect of the present invention, an optical cross connect for switching optical signals between a plurality of optical ports includes a substrate having a first surface facing the optical ports. A plurality of reflective microstructures are formed on the first surface of the substrate. Each reflective microstructure includes an optically reflective surface and is associated with one of the optical ports. Each reflective microstructure is positionable to orient its reflective surface to reflect an optical signal receivable from its associated optical port to the reflective surface of at least one other reflective microstructure. Each reflective microstructure is also positionable to orient its reflective surface to reflect an optical signal receivable from at least one other reflective microstructure to its associated optical port.

By properly orienting any pair of reflective microstructures on the substrate, an optical signal can be switched from any optical port to any other optical port. In this regard, the optical cross connect may further include a plurality of positioning systems formed on the substrate. Each positioning system is associated with one of the reflective microstructures and is operable to both elevate its associated reflective microstructure from the first surface of the substrate and tilt its associated reflective microstructure with respect to the first surface of the substrate with at least two degrees of freedom (e.g., about two substantially orthogonal axes). The reflective microstructures and their associated positioning systems may be respectively arranged and configured such that centers of the reflective surfaces of the reflective microstructures are aligned with central axes of their associated optical ports when the reflective microstructures are elevated at a specified height from the first surface of said substrate. This initial alignment helps maintain alignment of the optical signal beams with the reflective surfaces of the reflective microstructures as the reflective microstructures are tilted to redirect the optical signals since tilting of the reflective microstructures may result in small lateral movements of the centers of the reflective microstructures. Further, although many configurations are possible, the reflective surfaces of the reflective microstructures may, for example, be circular or elliptical in area. Employing elliptical reflective surfaces may provide for greater efficiency in the amount of optical energy that is reflected for the footprint area consumed by the reflective microstructures. This is because a typical telecommunications optical signal beam is circular in cross-section and thus has an elliptically shaped intersection with a flat surface intersecting the beam at an angle thereto.

If desired (e.g., to protect the surface of the substrate and the reflective microstructures and positioning systems formed thereon), the optical cross connect may further include a lid positionable between the optical ports and the first surface of the substrate. The lid may be hermetically sealed with the substrate to prevent the entry of contaminants into the switch interface. The lid is configured to permit transmission of optical signals therethrough between each optical port and its associated reflective microstructure. For example, the portions of the lid between the optical ports and the reflective microstructures may be made of an optically clear material.

The optical ports may comprise optical fiber ends that abut a side of the lid that faces away from the first surface of the substrate. In this regard, the lid may also facilitate alignment of the optical fiber ends with their associated reflective microstructures. For example, there may be a plurality of holes within which the optical fiber ends are receivable formed on the side of the lid facing away from the first surface of the substrate. The fiber end receiving holes can be arranged on the lid in a pattern appropriate to align the optical fiber ends with the reflective microstructures when the reflective microstructures are in a predetermined position (e.g., when the reflective microstructures are elevated at a specified height from the first surface of the substrate). Alternatively, the optical cross connect may further include one or more plates that are attachable to the lid. The plate(s) include a plurality of holes within which the optical fiber ends are receivable. The fiber end receiving holes in the plate(s) are arranged in a pattern appropriate to align the optical fiber ends with the reflective microstructures when the plate(s) are attached on the lid. Pins, grooves, notches or the like may be employed to ensure proper positioning of the plates when attaching the plates to the lid.

In addition to facilitating proper alignment of the optical fiber ends with the reflective microstructures, the lid may also be configured to provide for efficient transmission of optical signals to/from the optical fiber ends from/to the reflective microstructures. In this regard, there may be a plurality of lenses disposed on a side of the lid facing the first surface of the substrate. The lenses are arranged in a pattern corresponding with the fiber end receiving holes in the lid (or the fiber end receiving holes in the plates when attached to the lid). Sections of optical fiber cores may extend through the lid (and the plate(s) if attached) between the holes and the lenses. Each lens focuses an optical signal transmitted from its associated optical fiber end and section of optical fiber core into a free space optical beam for transmission through the switch interface to its associated reflective microstructure. Each lens also focuses a free space optical beam received from its associated reflective microstructure onto the section of optical fiber core for transmission through the lid into its associated optical fiber end. Numerous other lens locations are possible. For example, the lenses may be disposed within the fiber end receiving holes in the lid or within the fiber end receiving holes of the plate(s).

According to another aspect of the present invention, an optical cross connect for switching an optical signal between a first plurality of optical ports and a second plurality of optical ports includes a substrate having a first surface facing the first and second pluralities of optical ports. A first plurality of reflective microstructures are formed on the first surface of the substrate. Each of the reflective microstructures of the first plurality of reflective microstructures is associated with one of the first plurality of optical ports and includes an optically reflective surface. A second plurality of reflective microstructures are formed on the first surface of the substrate. Each reflective microstructure of the second plurality of reflective microstructures is associated with one of the second plurality of optical ports and includes an optically reflective surface. Each reflective microstructure of the first plurality of reflective microstructures is positionable to orient its reflective surface to reflect an optical signal receivable from its associated optical port to the reflective surface of at least one of the reflective microstructures of the second plurality of reflective microstructures and to reflect an optical signal receivable from the reflective surface of at least one of the reflective microstructures of the second plurality of reflective microstructures to its associated optical port. Each reflective microstructure of the second plurality of reflective microstructures is positionable to orient its reflective surface to reflect an optical signal receivable from the reflective surface of at least one of the reflective microstructures of the first plurality of reflective microstructures to its associated optical port and to reflect an optical signal receivable from its associated optical port to the reflective surface of at least one of the reflective microstructures of the first plurality of reflective microstructures. In this regard, the substrate may have positioning systems associated with each reflective microstructure formed thereon that are operable to elevate their associated reflective microstructures from the first surface of the substrate and tilt their associated reflective microstructures with respect to the first surface of the substrate with at least two degrees of freedom (e.g., about two substantially orthogonal axes).

The first and second pluralities of reflective microstructures may, for example, be arranged in a plurality of rows on the first surface of the substrate. In this regard, the reflective microstructures within an outer row may be elevatable to a greater height from the first surface of the substrate than the reflective microstructures within an adjacent inner row. For example, if there are four straight, parallel rows of reflective microstructures, the reflective microstructures in the two outer rows may be elevatable to a greater height from the first surface of the substrate than the reflective microstructures in the two adjacent inner rows so that the reflective microstructures in the outer rows can "look over" elevated reflective microstructures in the inner rows adjacent thereto. In one embodiment, this is accomplished by fabricating the positioning systems associated with the reflective microstructures in the outer rows to have longer length lever arms/pivot members than the positioning systems associated with the reflective microstructures in the inner rows. The reflective microstructures may also be arranged in other row-like manners such as, for example, one or more concentric arcs or a combination of straight rows and concentric arcs, as well as in non row-like patterns.

Each reflective microstructure of the first plurality of reflective microstructures must rotate through a range of tilt angles in order to reflect an optical signal to or receive an optical signal from any one of the reflective microstructures of the second plurality of reflective microstructures. Likewise, each reflective microstructure of the second plurality of reflective microstructures must rotate through a range of tilt angles in order to receive an optical signal from or reflect an optical signal to any one of the reflective microstructures of the first plurality of reflective microstructures. The required range of tilt angles for a given reflective microstructure may vary depending upon the position of such reflective microstructure on the substrate with respect to the other reflective microstructures. However, the positioning system associated with each reflective microstructure may be oriented on the substrate such that the required range of tilt angles is symmetric about an axis of symmetry of such positioning system. For example, the positioning systems may be rotated relative to the lines along which the rows of reflective microstructures are arranged. In this regard, the reflective microstructures at either end of a row of reflective microstructures may be rotated by a greater amount than the reflective microstructures towards the middle of the row.

According to a further aspect of the present invention, an optical cross connect for switching an optical signal between a first plurality of optical ports and a second plurality of optical ports includes a substrate having a first surface facing the first and second pluralities of optical ports. A first plurality of reflective microstructures are formed on the first surface of the substrate. Each reflective microstructure of the first plurality of reflective microstructures includes an optically reflective surface and is associated with one of the first plurality of optical ports. A second plurality of reflective microstructures are also formed on the first surface of the substrate. Each reflective microstructure of the second plurality of reflective microstructures includes an optically reflective surface and is associated with one of the second plurality of optical ports. The optical cross connect further includes an optically reflective area facing and spaced away from the first surface of the substrate. The optically reflective area is positioned for reflecting optical signals between the reflective surface of any one of the reflective microstructures of the first plurality of reflective microstructures and the reflective surface of any one of the reflective microstructures of the second plurality of reflective microstructures. Each reflective microstructure of the first and second pluralities of reflective microstructures is positionable to orient its reflective surface to reflect an optical signal receivable from its associated optical port to the optically reflective area and to reflect an optical signal receivable from the optically reflective area to its associated optical port.

When the optical cross connect includes a lid that is positionable between the optical ports and the first surface of the substrate, the optically reflective area may be provided on a side of the lid that faces the first surface of the substrate. In this regard, the lid may, for example, be configured for permitting transmission of optical signals therethrough between each optical port and its associated reflective microstructure by having first and second clear areas separated by the optically reflective area.

According to yet another aspect of the present invention, an optical cross connect for switching optical signals between a plurality of optical ports includes a substrate having a first surface facing the optical ports. A plurality of reflective microstructures are formed on the first surface of the substrate. Each reflective microstructure is associated with one of the optical ports and includes an optically reflective surface. A plurality of positioning systems are also formed on the first surface of the substrate. Each positioning system is associated with one of the reflective microstructures. Each positioning system is operable to elevate its associated reflective microstructure from the first surface of the substrate and tilt its associated reflective microstructure with at least two degrees of freedom with respect to the first surface of said substrate.

At least one of the positioning systems includes a first lever arm of a first length. The first lever arm of a first length is attached at a first end thereof to its associated reflective microstructure and at second end thereof to the substrate. At least one of the positioning systems includes a second lever arm of a second length. The second lever arm of a second length is attached at a first end thereof to its associated reflective microstructure and at a second end thereof to the substrate. The first and second lever arms are pivotable about their second ends to lift and/or tilt their associated reflective microstructure. In this regard, the positioning systems may include electrostatic actuators or other appropriate actuation devices operable to effect pivoting of the first and second lever arms about the second ends thereof.

The first and second lengths of the first and second lever arms, respectively, are different so that pivoting of the first and second lever arms through the same angular displacement achieves different vertical displacements of the first ends of the first and second lever arms with respect to the first surface of the substrate. In this regard, the first length may, for example, be between about 500 microns and about 1000 microns, and the second length may, for example, be between about 1000 and about 1500 microns. Having different length first and second lever arms allows the respective reflective microstructures associated therewith to be elevated to different heights from the substrate permitting one reflective microstructure to "look over" the other while applying the same level control signal to each positioning system. In this regard, the reflective microstructures may, for example, be arranged in a plurality of rows or arcs on the first surface of said substrate. The positioning systems associated with reflective microstructures in a first one of the rows or arcs may include first lever arms of a first length and the positioning systems associated with reflective microstructures in a second one of the rows or arcs may include second lever arms of a second length. Thus, upon application of the same level control signal, the reflective microstructures in the first row are elevated to one height from the substrate and the reflective microstructures in the second row or arc are elevated to a greater height (assuming the second length is greater than the first length) from the substrate thereby allowing the reflective microstructures in the second row or arc to "look over" the reflective microstructures in the first row or arc.

According to one more aspect of the present invention, an optical cross connect for switching an optical signal between a first optical port and any one of a plurality of second optical ports includes a substrate having a surface facing both the first optical port and the plurality of second optical ports. A first reflective microstructure is formed on the surface of the substrate. The first reflective microstructure is associated with the first optical port and includes an optically reflective surface. A plurality of second reflective microstructures are formed on the surface of the substrate. Each second reflective microstructure is associated with one of the second optical ports and includes an optically reflective surface. The first reflective microstructure is positionable to orient its reflective surface to reflect an optical signal receivable from the first optical port to the reflective surface of any one of the second reflective microstructures. The first reflective microstructure is also positionable to receive an optical signal reflected from the reflective surface of any one of the second reflective microstructures to the first optical port. Likewise, each second reflective microstructure is positionable to orient its reflective surface to reflect an optical signal receivable from the first reflective microstructure to its associated second optical port and to reflect an optical signal receivable from its associated second optical port to the first reflective microstructure.

The second reflective microstructures may, for example, be arranged in at least one arc with the first reflective microstructure being located on a concave side of the arc. In this regard, the second reflective microstructures may only need to be positionable with one degree of freedom. The second reflective microstructures may be arranged in an outer and an inner arc. Several possibilities exist for providing optical paths between the first reflective microstructure and the reflective microstructures in the outer arc that are not blocked by elevated reflective microstructures in the inner arc. For example, the reflective microstructures in the outer arc may be elevatable to a greater height from the substrate than those in the inner arc (e.g., by using longer lever arms in positioning systems associated therewith). By way of another example, the reflective microstructures in the inner and outer arcs may be arranged such that each is located at different angular locations with respect to the first reflective microstructure with sufficient angular spacing provided between each angular location.

According to a still further aspect of the present invention, an optical cross connect switch includes a support (e.g., a single common substrate) and pluralities of first input mirror microstructures, second input mirror microstructures, first output mirror microstructures, and second output mirror microstructures. The first input mirror microstructures are disposed within a first row on a first side of a first reference axis, and the second input mirror microstructures are disposed within a second row on the first side of the first reference axis in spaced relation to the first row such that the first row is disposed between the second row and the first reference axis. The first output mirror microstructures are disposed within a third row on a second side of the first reference axis that is opposite the first side, and the second output mirror microstructures are disposed within a fourth row on the second side of the first reference axis in spaced relation to the third row such that the third row is disposed between the fourth row and the first reference axis. The optical cross connect switch also includes a first pivot member for each of the first input mirror microstructures, a second pivot member for each of the second input mirror microstructures, a third pivot member for each of the first output mirror microstructures, and a fourth pivot member for each of the second output mirror microstructures. Each first pivot member interconnects its corresponding first input mirror microstructure with the support and is of a first length. Each second pivot member interconnects its corresponding second input mirror microstructure with the support and is of a second length that is greater than the first length. Each said third pivot member interconnects its corresponding first output mirror microstructure with the support and is of a third length. Each fourth pivot member interconnects its corresponding second output mirror microstructure with the support, and is of a fourth length that is greater than the third length. Having the second length greater the first length and the fourth length greater than the third length allows the second input reflective microstructures within the second row to "look over" the first input reflective microstructures within the first row and the second output reflective microstructures within the fourth row to "look over" the first output reflective microstructures in the third row.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1A:
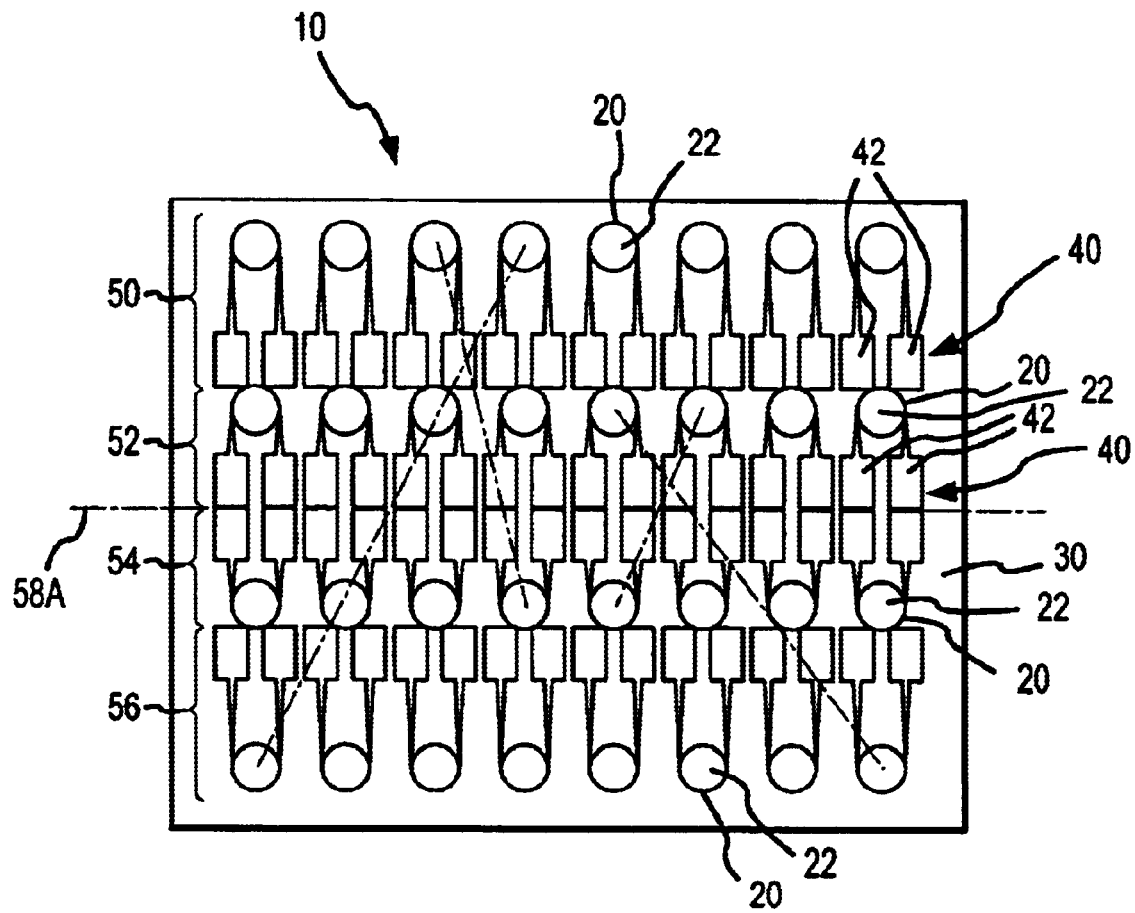
FIGS. 1A–B show top and end views of one embodiment of a single chip OXC in accordance with the present invention for switching optical signals between N optical inputs and N optical outputs.
Figure 1B:
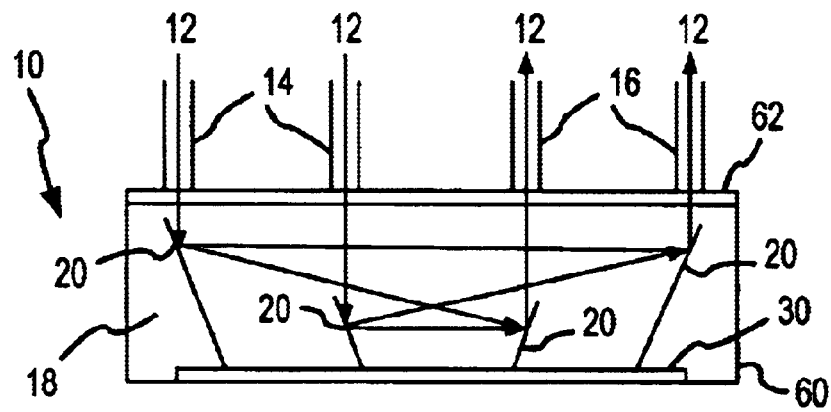

FIGS. 1A–B show top and end views of one embodiment of a single chip 2N OXC 10 in accordance with the present invention where N=16. The single chip 2N OXC 10 is configured to switch optical signals 12 between any one of N input optical fibers 14 and any one of N output optical fibers 16 within a compact free space switch interface 18. In this regard, the switch interface 18 is referred to as "free space" because it does not incorporate optical fibers, waveguides, or the like within which the optical signals 12 propagate between switching points (i.e., points where the direction of the optical signals 12 changes). Rather, the optical signals 12 propagate through "free space" (e.g., a mixture of gases such as air, a single gas, or a vacuum) between switching points in the switch interface 18.

The single chip 2N OXC 10 is a bi-directional optical signal switching device. In this regard, the terms "input" and "output" are used for purposes of convenience in referring to the optical fibers 14, 16, and are not intended to restrict the single chip 2N OXC 10 to unidirectional propagation of optical signals 12 through the switch interface 18. For example, one of the input optical fibers 14 may receive an optical signal 12 switched to it by the single chip 2N OXC 10 from one of the output optical fibers 16 or vice versa.

The single chip 2N OXC 10 includes thirty-two reflective microstructures 20 built/assembled on a substrate 30 and thirty-two positioning systems 40 associated with the reflective microstructures 20 that are also built/assembled on the substrate 30. In this regard, the reflective microstructures 20 and positioning systems 40 may be built/assembled on the substrate 30 using surface micromachining techniques such as described in U.S. Pat. No. 5,783,340, issued Jul. 21, 1998, and entitled "METHOD FOR PHOTOLITHOGRAPHIC DEFINITION OF RECESSED FEATURES ON A SEMI-CONDUCTOR WAFER UTILIZING AUTO-FOCUSING ALIGNMENT"; U.S. Pat. No. 5,798,283, issued Aug. 25, 1998, and entitled "METHOD FOR INTEGRATING MICROELECTROMECHANICAL DEVICES WITH ELECTRONIC CIRCUITRY"; U.S. Pat. No. 5,804,084, issued Sep. 8, 1998, and entitled "USE OF CHEMICAL POLISHING IN MICROMACHINING"; U.S. Pat. No. 5,867,302, issued Feb. 2, 1999, and entitled "BISTABLE MICROELECTROMECHANICAL ACTUATOR"; and U.S. Pat. No. 6,082,208, issued Jul. 4, 2000, and entitled "METHOD FOR FABRICATING FIVE-LEVEL MICRO-ELECTROMECHANICAL STRUCTURES AND MICRO-ELECTROMECHANICAL TRANSMISSION FORMED", the entire disclosures of which are incorporated by reference herein in their entirety. It will be appreciated that in addition to surface micromachining, a number of other microfabrication technologies may be appropriate for use in fabricating the reflective microstructures 20 and positioning systems 40 or portions thereof on the substrate 30. Such microfabrication technologies include lithography galvanoforming abforming (LIGA), sacrificial LIGA (SLIGA), bulk micromachining, mold micromachining, microelectrodischarge machining (EDM), laser micromachining, 3-D stereolithography, and other techniques used to fabricate microstructures on substrates.

Each reflective microstructure 20 includes a reflective surface 22 and is associated with a separate one of the input optical fibers 14 or the output optical fibers 16. For purposes of reference, a reflective microstructure 20 that is associated with one of the input optical fibers 14 is referred to herein as an "input reflective microstructure", and a reflective microstructure 20 that is associated with one of the output optical fibers is referred to herein as an "output reflective microstructure." As with the optical fibers 14, 16, the use of the terms "input" and "output" when referring to the reflective microstructures 20 is not intended to restrict the single chip 2N OXC 10 to unidirectional propagation of optical signals 12 through the switch interface 18.

The reflective microstructures 20 (and their associated positioning systems 40) are arranged in four rows on the substrate 30: (1) an outer row 50 of output reflective microstructures 20; (2) an inner row 52 of output reflective microstructures 20; (3) an inner row 54 of input reflective microstructures 20; and (4) an outer row 56 of input reflective microstructures 20. The outer and inner rows 50, 52 of output reflective microstructures 20 are located on one side of a first reference axis 58A, and the inner and outer rows 54, 56 of input reflective microstructures 20 are located on the other side of the first reference axis 58A. It should be noted that although in this instance, the first reference axis 58A divides the substrate into two substantially equal halves, in other embodiments, the first reference axis 58A may divide the substrate into unequal portions. Each row 50–56 includes N/2 reflective microstructures 20. Each positioning system 40 is operable in response to appropriate control signals to both elevate its associated reflective microstructure 20 above the surface of the substrate 30 and to tilt its associated reflective microstructure 20 with two degrees of freedom (e.g., about two substantially orthogonal axes of rotation) with respect to the surface of the substrate. The control signals may be supplied to the positioning systems 40 via electrical interconnects (not shown) formed on the substrate 30. By elevating the reflective microstructures 20 above the surface of the substrate 30, substantial tilt angles (in excess of 45 degrees) are achievable. In this regard, FIG. 1C shows an exemplary positioning system 40 capable of both elevating and tilting an associated reflective microstructure 20.

Figure 1C:
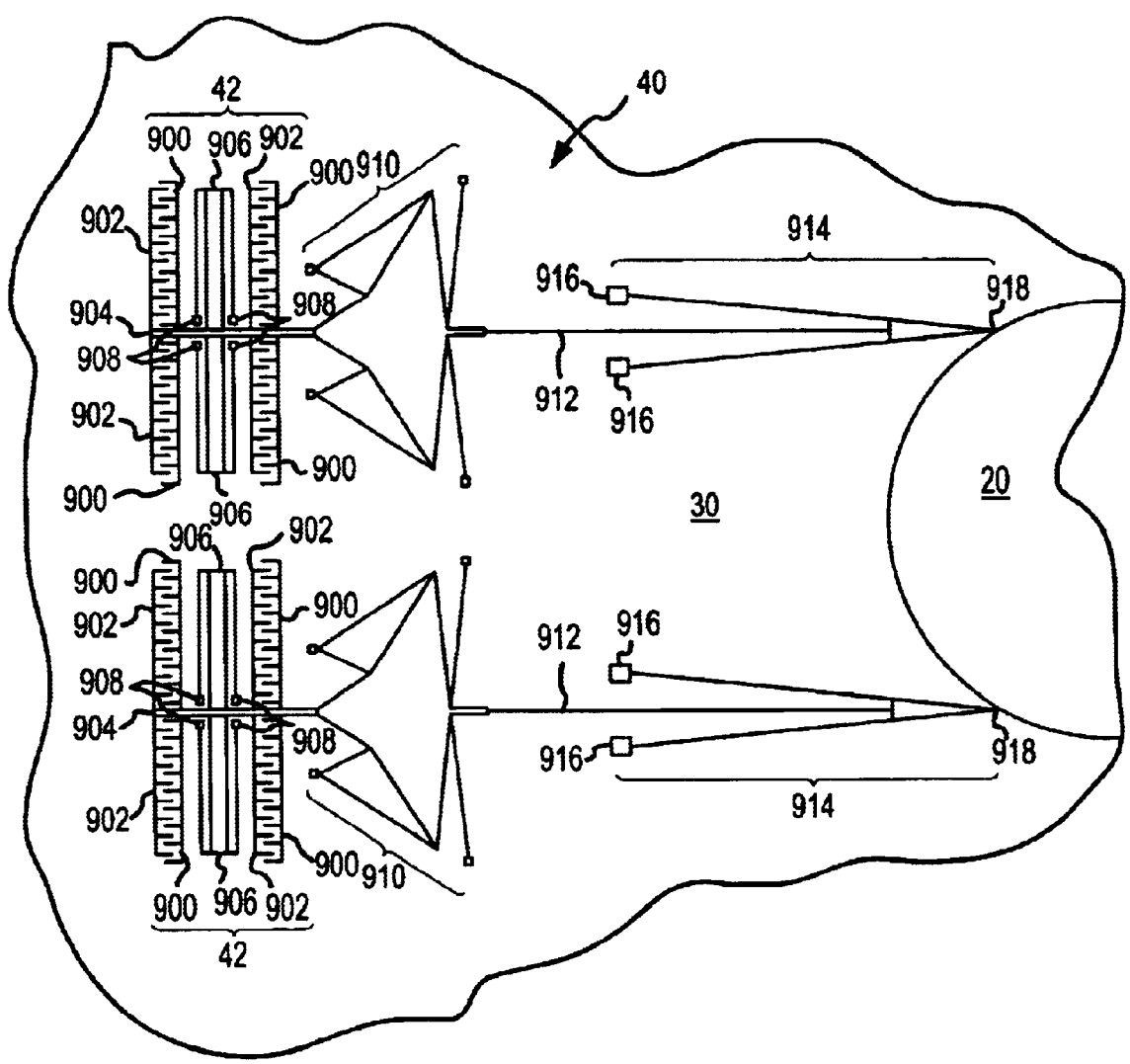
FIG. 1C shows a top view of an exemplary positioning system for positioning an associated one of the reflective microstructures of the single chip OXC of FIGS. 1A–B.

Referring now to FIG. 1C, there is shown a top view of an exemplary positioning system 40. Each positioning system 40 is configured in a similar fashion and includes a pair of electrostatic actuator microstructures 42. Each actuator microstructure 42 includes several stationary combs 900 that are fixed to the substrate 30 and several moveable combs 902 that are attached to a moveable frame 904. The moveable frame 904 is supported above the substrate 30 by a folded support spring 906 anchored to the substrate 30 at four anchor points 908 to permit lateral movement of the frame 904. Upon application of a control voltage via electrical interconnects (not shown) across the combs 900, 902, the moveable combs 902 are pulled laterally towards the stationary combs 900 thereby moving the frame 904 laterally. The amount of lateral movement corresponds with the magnitude of the actuation voltage applied. The frame 904 is coupled through a displacement multiplier 910 to a tether 912. The tether 912 is connected to an A-frame structure 914. The A-frame structure 914 is anchored at its base 916 to the substrate 30 and is connected at its apex 918 to the reflective microstructure 20. Instead of being connected at its apex 918 to the reflective microstructure 20, the A-frame structure 914 may include a rigid extension arm (not shown) extending from its apex 918 which is connected at an opposite end thereof to the reflective microstructure 20. The displacement multiplier 910 amplifies the small lateral movement of the frame 904 and also phase shifts the movement of the frame 904 by 180 degrees (i.e., lateral movement of the frame 904 to the right becomes lateral movement of the tether 912 to the left, and vice versa).

Because the A-frame structure 914 is anchored to the substrate 30 at its base 916, when the tether 912 is moved laterally, the apex 918 (and rigid extension arm, if any) of the A-frame structure 914 is rotated upwardly through an arc to apply upward force to the reflective microstructure 20 to lift the reflective microstructure 20 where it is attached to the A-frame structure 914 (or rigid extension arm, if any). In essence, the A-frame structures 914 (and rigid extension arms, if any) act as lever arms. The longer the lever arms comprised by the A-frame structures 914 (and rigid extension arms, if any) are, the greater the amount of upward displacement of the reflective microstructure 20 for a given angular displacement of the lever arm.

In addition to being connected to the A-frame structures 914, the reflective microstructure 20 may also be attached in a pivotable manner to the substrate 30. Since, the apexes 918 (or rigid extension arms) of the A-frame structures 914 are connected to different locations on the reflective microstructure 20, the reflective microstructure 20 can be tilted with one degree of freedom by applying equal actuation voltages to the combs 900, 902. Tilting of the reflective microstructure 20 with two degrees of freedom can be achieved by applying unequal actuation voltages to the combs 900, 902. With positioning systems 40 configured as described, large tilt angles (e.g., in excess of 45 degrees) may be achieved. In this regard, the positioning systems 40 and reflective microstructures 20 may be configured as is described in greater detail in co-pending U.S. patent application Ser. No. 09/966,963 entitled "LARGE TILT ANGLE MEM PLATFORM", the disclosure of which is incorporated by reference herein in its entity.

Each positioning system 40 associated with the output reflective microstructures 20 in the outer row 50 of output reflective microstructures 20 is configured to elevate the output reflective microstructures 20 in the outer row 50 a sufficient distance from the surface of the substrate 30 so as to provide a line of sight over the output reflective microstructures 20 in the inner row 52 of output reflective microstructures 20 to each of the input reflective microstructures 20 in the inner and outer rows 54, 56 of input reflective microstructures. Each positioning system 40 associated with the input reflective microstructures 20 in the outer row 56 of the input reflective microstructures 20 is configured to elevate the input reflective microstructures 20 in the outer row 56 a sufficient distance from the surface of the substrate 30 so as to provide a line of sight over the input reflective microstructures 20 in the inner row 54 of input reflective microstructures 20 to the output reflective microstructures 20 in the outer and inner rows 50, 52 of output reflective microstructures 20. By tilting the reflective microstructures 20 at appropriate angles with respect to the substrate 30, an optical signal 12 can be directed through the switch interface 18 from any one of the input optical fibers 14 to any one of the output optical fibers 16.

The switch interface 18 and substrate 30 may be enclosed within a hermetically sealed package 60 having an optically transmissive (e.g., clear) lid 62 overlying and spaced away from the surface of the substrate 30. The lid 62 need only be spaced away from the surface of the substrate 30 by a distance sufficient to permit the necessary elevation and tilting of the input and output reflective microstructures 20 (e.g., between about 1 mm and 3 mm). The large tilt angles achievable with the reflective microstructures 20 and their associated positioning systems 40 permit the ends of the input and output optical fibers 14, 16 to be very near their associated reflective microstructures 20. In this regard, the ends of the input and output optical fibers 14, 16 may abut the top of the lid 62 in order to provide for a minimal path length (i.e. the distance traveled by an optical signal 12) through the switch interface 18 from the ends of the input optical fibers 14 to the ends of the output optical fibers 16. Minimizing the path length reduces the required alignment accuracy and reduces any delays introduced via the switching operation.

Figure 2:
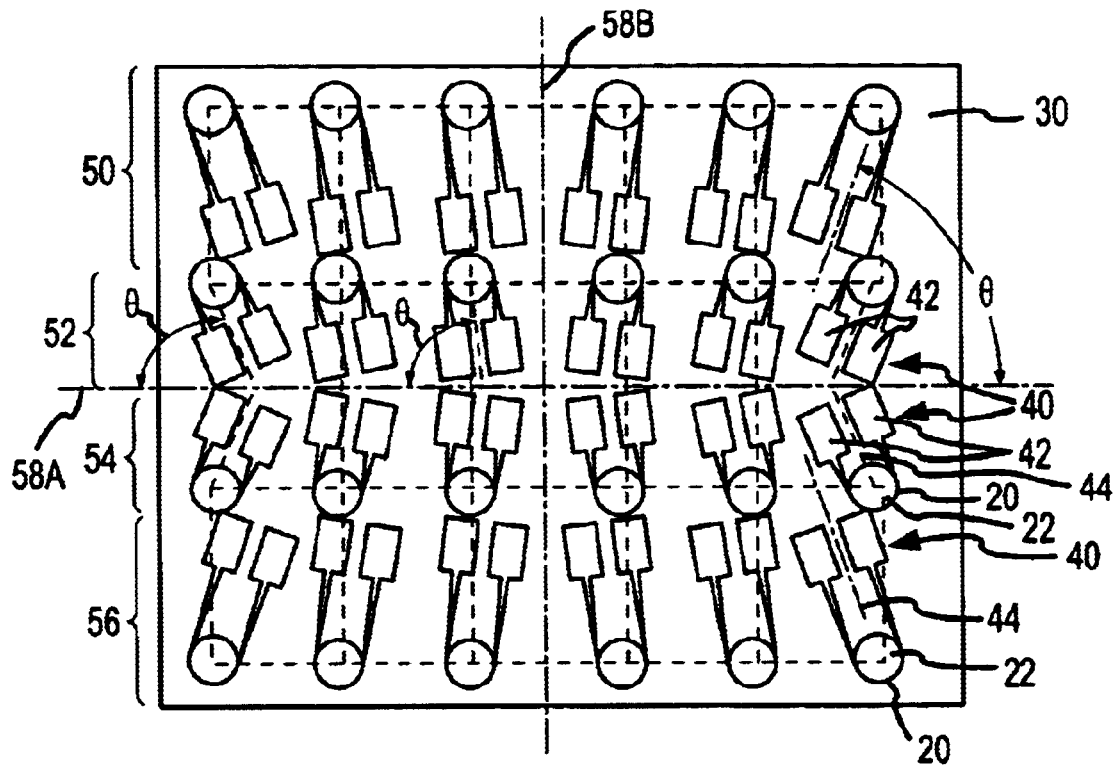
FIG. 2 shows a top view of an embodiment of a single chip OXC in accordance with the present invention wherein the range of rotation angles required for a given reflective microstructure is symmetric about the axis of symmetry of its associated positioning system.

Referring now to FIG. 2, there is shown an embodiment of a single chip 2N OXC 110 (with N=16) wherein the orientation of the positioning systems 40 has been modified so that the range of tilt angles required of each reflective microstructure 20 to direct an optical signal 12 from any one of the input reflective microstructures 20 to any one of the output reflective microstructures 20 is symmetric about an axis of symmetry 44 of the positioning system 40 associated therewith. As with the embodiment shown in FIGS. 1A–B, a plurality of reflective microstructures 20 and associated positioning systems 40 are arranged in outer and inner rows 50, 52 of output reflective microstructures 20 that are associated with output optical fibers (not shown in FIG. 2) and inner and outer rows 54, 56 of input reflective microstructures 20 associated with input optical fibers (not shown in FIG. 2) on a substrate 30. The outer and inner rows 50, 52 of output reflective microstructures 20 are located on one side of a first reference axis 58A, and the inner and outer rows 54, 56 of input reflective microstructures 20 are located on the other side of the first reference axis 58A. Unlike the embodiment shown in FIGS. 1A–B, each positioning system 40 is rotated at a progressively smaller acute angle θ with respect to the first reference axis 58A proceeding to the left and right from a second reference axis 58B substantially orthogonal to and intersecting the first reference axis 58B at the middle of the rows 50–56. Thus, the positioning systems 40 at the ends of the rows 50–56 are rotated by a smaller acute angle than the positioning systems 40 in the middle of the rows 50–56. It is also possible to position the reflective microstructures 20 such that periodicity occurs when the mirrors are elevated from the substrate 30 to the middle of their normal operating range. This enables periodicity of the input and output fibers 14, 16 when they are aligned with the reflective microstructures 20.

Figure 3:
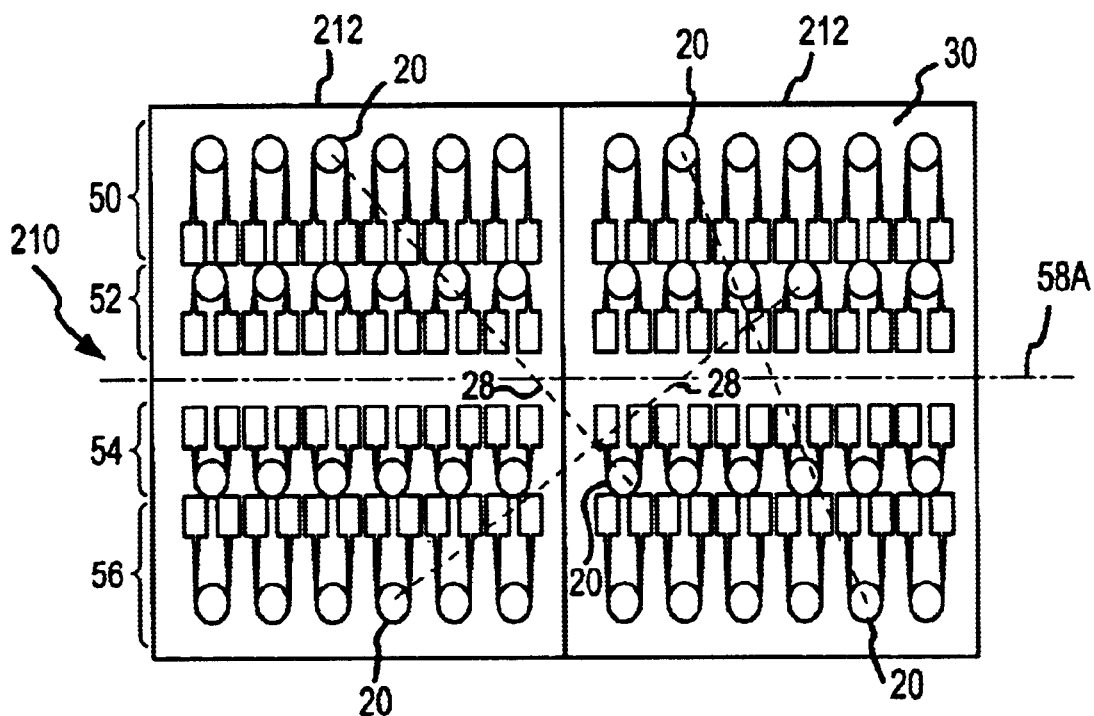
FIG. 3 shows a top view of an embodiment of a single chip OXC in accordance with the present invention having two identical dies tiled adjacent to one another on a single substrate.

Referring now to FIG. 3, by providing multiple identical dies on a single substrate 30 it is possible to increase the number of input optical fibers 14 and output optical fibers 16 interfacable by the same arrangement of input and output reflective microstructures 20. FIG. 3 shows one embodiment of a single chip 2N OXC 210 (with N=24) that includes two identical dies 212 with each die 212 having twelve input reflective microstructures 20 and twelve output reflective microstructures 20. Within each die 212, the reflective microstructures 20 and associated positioning systems 40 are arranged in outer and inner rows 50, 52 of output reflective microstructures 20 that are associated with output optical fibers (not shown in FIG. 3) and inner and outer rows 54, 56 of input reflective microstructures 20 associated with input optical fibers (not shown in FIG. 3). The outer and inner rows 50, 52 of output reflective microstructures 20 are located on one side of a first reference axis 58A, and the inner and outer rows 54, 56 of input reflective microstructures 20 are located on the other side of the first reference axis 58A. The dies 212 are arranged in a side-by-side manner on the substrate 30, thereby effectively achieving outer and inner rows 50, 52 of output reflective microstructures 20 which are twelve reflective microstructures 20 long and inner rows 54, 56 of input reflective microstructures 20 which are also twelve reflective microstructures 20 long. Each positioning system 40 may be configured such that any one of the input reflective microstructures 20 is rotatable to face any one of the output reflective microstructures 20, and vice versa, regardless of which die 212 the reflective microstructures 20 are on. Alternatively, if the positioning systems 40 do not allow for sufficient rotation of each input reflective microstructure 20 to face any one of the output reflective microstructures 20, and vice versa, on either die 212 (e.g., when each die 212 is too wide), optical signals 12 may still be directed between any one of the input optical fibers 12 and any one of the output optical fibers 14 by directing the optical signals 12 off one or more intermediate reflective microstructures 20 on the same die 212 to one or more intermediate reflective microstructure 20 on the other die 212.

Figure 4:
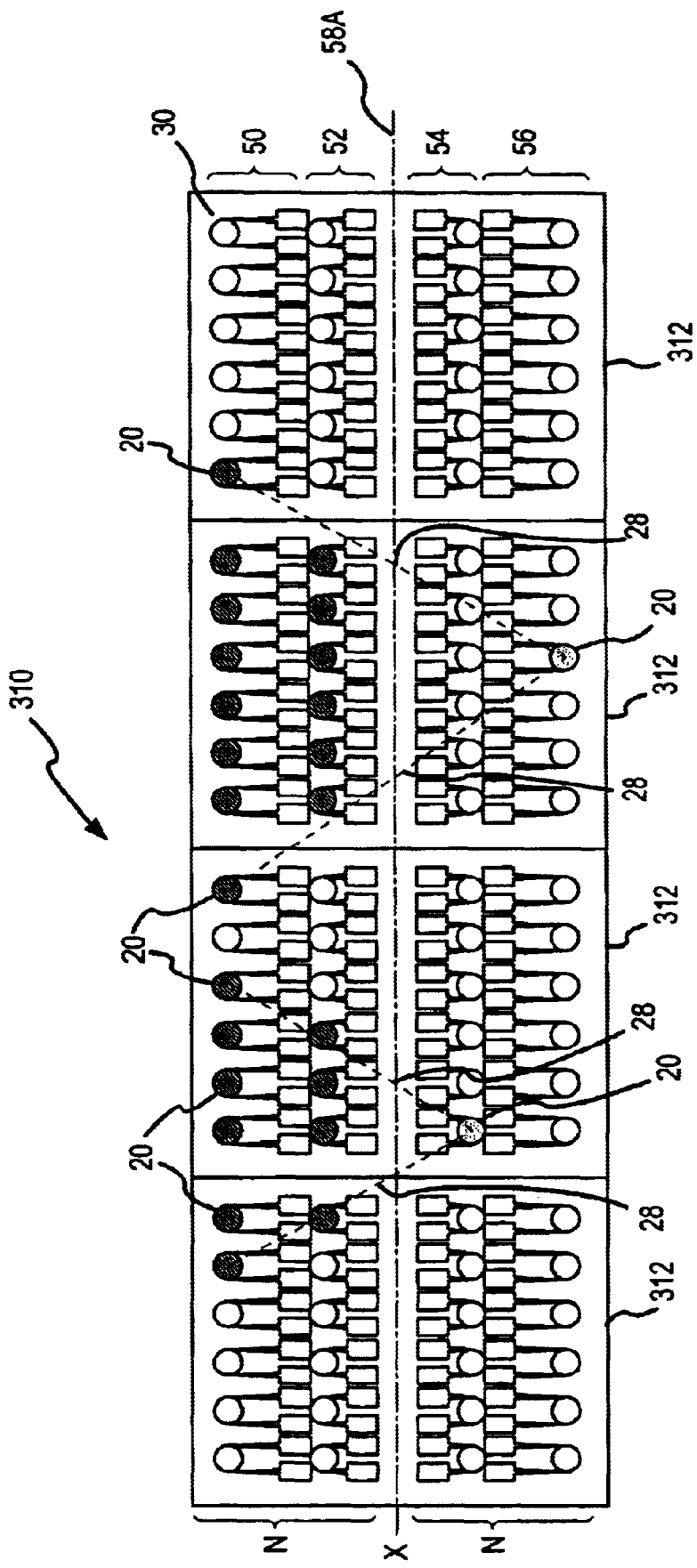
FIG. 4 shows a top view of an embodiment of a single chip OXC in accordance with the present invention having four identical dies tiled in a row on a single substrate.

FIG. 4 shows a single chip 2N OXC 310 wherein four identical dies 312 are tiled together in a side-by-side configuration on a single substrate 30 to provide a switch capable of switching optical signals 12 between any one of N=48 input optical fibers 14 and N=48 output optical fibers 16. Within each die 312, the reflective microstructures 20 and associated positioning systems 40 are arranged in outer and inner rows 50, 52 of output reflective microstructures 20 that are associated with output optical fibers (not shown in FIG. 4) and inner and outer rows 54, 56 of input reflective microstructures 20 associated with input optical fibers (not shown in FIG. 4). The outer and inner rows 50, 52 of output reflective microstructures 20 are located on one side of a first reference axis 58A, and the inner and outer rows 54, 56 of input reflective microstructures 20 are located on the other side of the first reference axis 58A. Each positioning system 40 is capable of tilting its associated reflective microstructure 20 through a fixed range of angles. Thus, each input reflective microstructure 20 addresses a separate set of output reflective microstructures 20 on one or more of the dies 312, and each output reflective microstructure 20 addresses a separate set of input reflective microstructures 20 on one or more of the dies 312. Some of the sets of addressable input and output reflective microstructures 20 overlap. Thus, if desired, switching of an optical signal 12 from an input optical fiber 14 associated with a reflective microstructure of one die 312 to an output optical fiber 16 associated with a reflective microstructure 20 of another die 312 is possible by reflecting the optical signal 12 off of one or more intermediate output and input reflective microstructures 20.

Figure 5A:
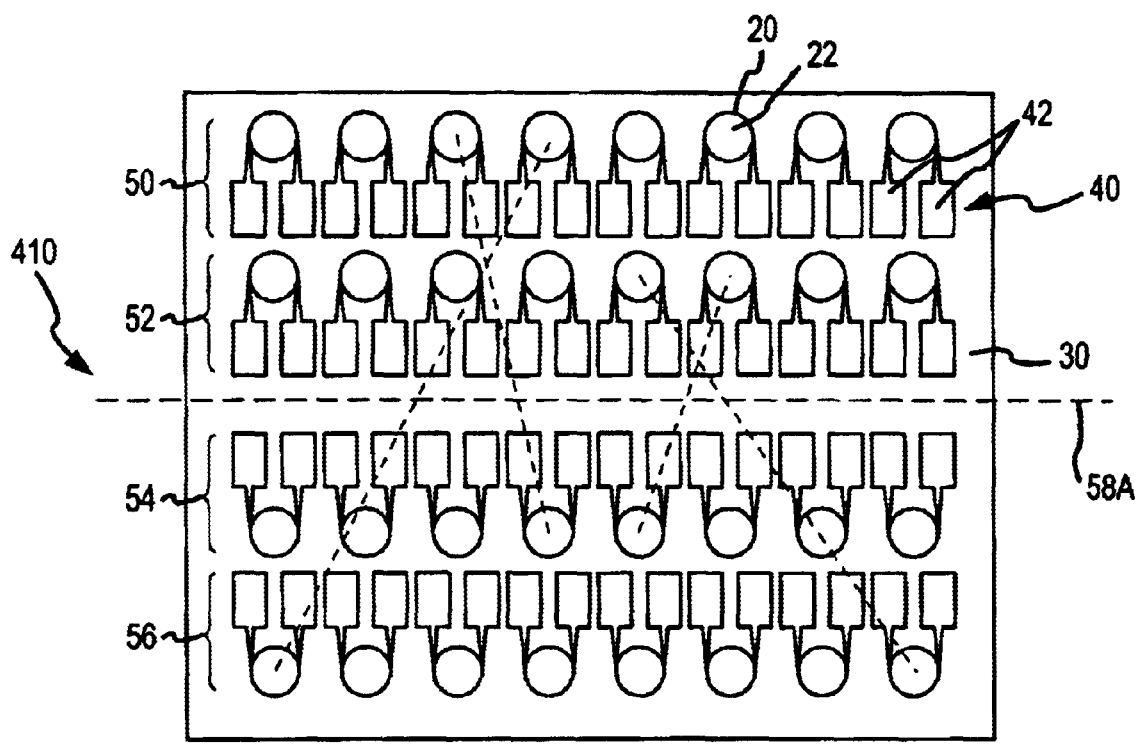
FIGS. 5A–B show top and end views of an embodiment of a single chip OXC in accordance with the present invention having a reflective surface provided on a portion of the underside of its lid.
Figure 5B:
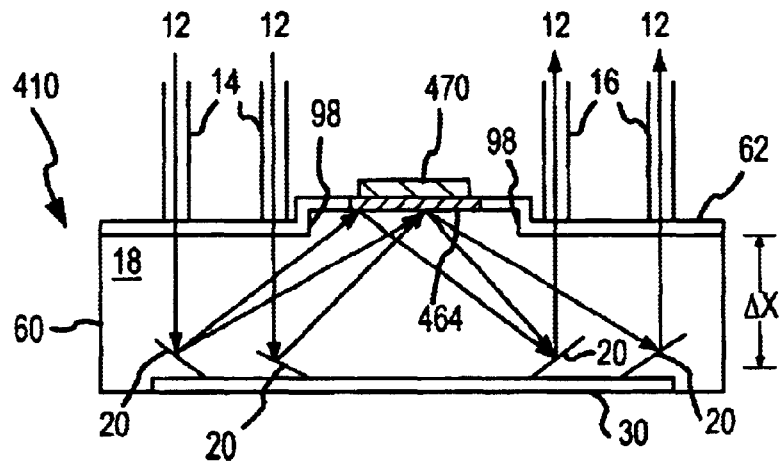

FIGS. 5A–B, show an embodiment of a single chip 2N OXC 410 having a reflective surface 464 provided on a portion of the underside of the optically transmissive lid 62. The reflective surface 464 provides for an optical pathway between any reflective microstructure 20 in the inner or outer rows 54, 56 of input reflective microstructures 20 and any reflective microstructure 20 in the inner or outer rows 50, 52 of output reflective microstructures 20 without requiring that the reflective microstructures 20 in the outer row 50 of output reflective microstructures 20 or in the outer row 56 of input reflective microstructures 20 be elevatable further from the surface of the substrate 30 than the reflective microstructures 20 in the inner rows 52, 54 of output and input reflective microstructures 20. In this regard, each positioning system 40 may be configured to elevate its associated reflective microstructure 20 to the same height regardless of whether the reflective microstructure 20 is in the inner or outer rows 50, 52, 54, 56. Not requiring elevation of the reflective microstructures 20 in the outer rows 50, 56 to greater heights above the surface of the substrate 30, further modularizes the design and fabrication of the single chip 2N OXC 410.

An optical signal 12 is switchable from any one of the input optical fibers 14 to any one of the output optical fibers 16 by orientating the input reflective microstructure 20 associated with the particular input optical fiber 14 to reflect the optical signal 12 off of the reflective surface 464 to the output reflective microstructure 20 associated with the desired output optical fiber 16. In addition to providing for reflection of the optical signals 12 in order to connect any one of the input reflective microstructures 20 with any one of the output reflective microstructures 20, the reflective surface 464 may also perform additional functions. For example, the reflective surface 464 may be configured to modify properties of the optical signals 12 such as their polarization. The reflective surface 464 may also be configured to permit the transmission of a very small fraction of each optical signal 12 therethrough to a light-sensitive structure 470 (e.g., a charge-coupled-device (CCD) array or photo-diode array) positioned on the outside of the lid 62 overlying the reflective surface 464. Information provided by such a light-sensitive structure 470 may be utilized to facilitate calibration of the reflective microstructures 20 and enable position monitoring and control of the reflective microstructures 20.

As is shown in the end view of FIG. 5B, the optically transmissive lid 62 may be contoured such that optically transmissive portions of the lid 62 overlying the reflective microstructures 20 are closer to the substrate 30 than the portion of the lid 62 having the reflective surface 464. This allows the ends of the input and output optical fibers 14, 16 to be positioned in very close proximity to the reflective microstructures 20 while still permitting a desired angle of incidence (e.g., between about 30 and 80 degrees, measured relative to the normal of the reflective surface 464) for the optical signals 12 upon the reflective surface 464. Allowing for such close proximity between the ends of the input and output optical fibers 14, 16 and the reflective microstructures 20 greatly facilitates alignment of the fibers 14, 16 with the reflective microstructures 20. In order to minimize optical losses, an index matching fluid may be used when abutting the ends of the input and output optical fibers 14, 16 to the lid 62.

Figure 6:
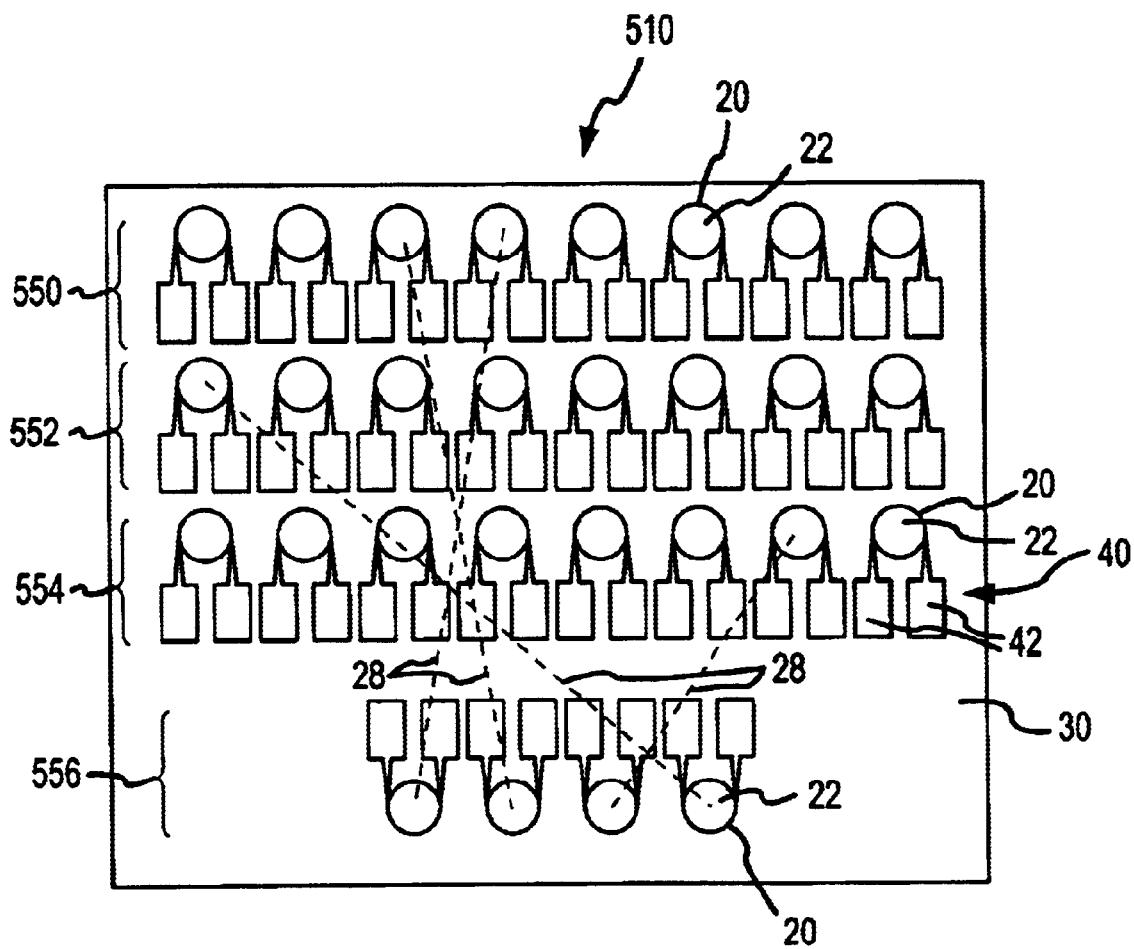
FIG. 6 shows a top view of one embodiment of a single chip OXC in accordance with the present invention for switching optical signals between N optical inputs and M optical outputs.

Referring now to FIG. 6, the single chip 2N OXCs 10, 110, 210, 310, 410 illustrated in FIGS. 1A–5B do not have to be symmetric (i.e., have the same number of input and output reflective microstructures 20 for switching signals between the same number of input and output optical fibers 14, 16), and may in general provide for switching of optical signals 12 between N input optical fibers 14 and M output optical fibers 16 where N equals M, N is greater than M, or N is less than M. For example, FIG. 6 shows an embodiment of a single chip N×M OXC 510 where N=4 and M=24. In this regard, the single chip N×M OXC 510 includes four input reflective microstructures 20 arranged in a single row 556 of input reflective microstructures 20 and twenty-four output reflective microstructures 20 arranged in three rows 550, 552, 554 of output reflective microstructures 20. The arrangement of the reflective microstructures 20 in the single chip N×M OXC 510 shown in FIG. 6 is only one possibility, and many other N×M arrangements are possible.

Figure 7A:
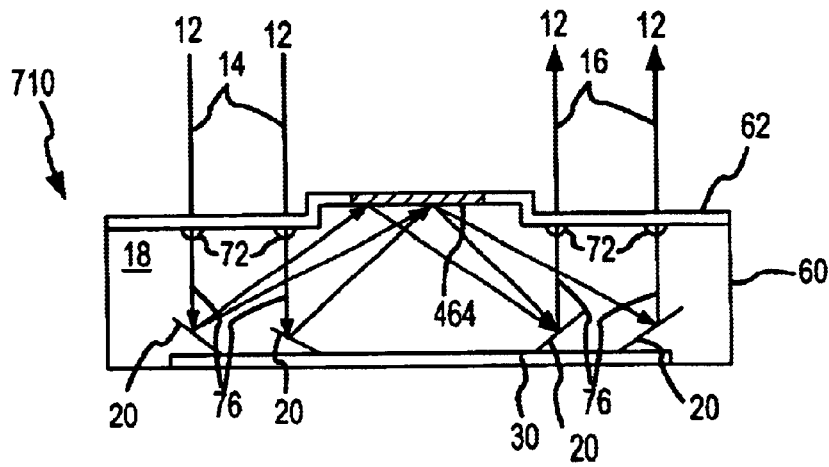
FIGS. 7A–B show an end view and an end view of a portion of a lid, respectively, of one embodiment of a single chip OXC in accordance with the present invention wherein the lid is configured to facilitate alignment of the optical fibers and to facilitate efficient transmission of optical signals between the optical fibers and the switch interface.
Figure 7B:
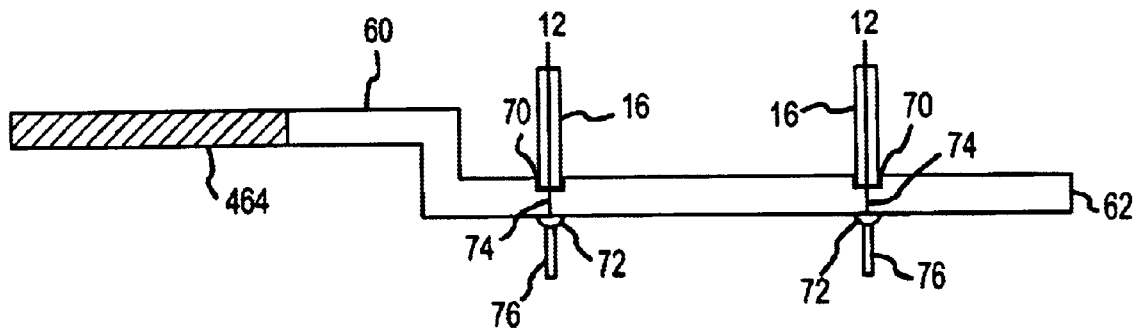

Referring now to FIGS. 7A–B, the lid 62 can be configured to facilitate alignment of the input and output optical fibers 14, 16 with their associated reflective microstructures 20 and also to facilitate efficient transmission of optical signals 12 from the ends of the input optical fibers 14 through the lid 62 and into the free space of the switch interface 18 and efficient transmission of optical signals 12 from the free space of the switch interface 18 through the lid 62 and into the ends of the output optical fibers 16. As is shown in FIG. 7B, the lid 62 may incorporate a fiber alignment structure comprised of a plurality of holes 70 formed in the top surface of the lid 62. The holes 70 receive the ends of the optical fibers 14, 16 and are positioned to be aligned with the reflective microstructures 20 when the lid 62 is correctly installed on the package 62 to facilitate proper alignment of the ends of the optical fibers 14, 16 with their associated reflective microstructures 20. The holes 70 may be tapered in order to provide for proper centering of the ends of the optical fibers 14, 16 in the holes 70. When inserting the ends of the optical fibers 14, 16 into the holes 70, refractive index matching fluid may be used to reduce optical losses between the ends of the optical fibers 14, 16 and the lid 62.

Lenses 72 are provided on the bottom surface of the lid 62 under each hole 70. Sections of optical fiber cores 74 are built into the structure of lid 62. Each optical fiber core 74 extends between an associated hole 70 and an associated lens 72. The sections of optical fiber core 74 allow for efficient transmission of optical signals 12 through the lid 62 between the ends of the optical fibers 14, 16 and the lenses 72. In this regard, when the lid 62 includes such optical fiber cores 74, the remainder of the lid 62 need not be optically transmissive. Depending upon the direction of propagation of an optical signal, each lens 72 receives an optical signal 12 that is transmitted through the lid 62 from its associated optical fiber 14, 16 end by its associated section of optical fiber core 74 and focuses the optical signal 12 into a free space optical beam 76 for transmission through the switch interface 18 to its associated reflective microstructure 20. Likewise, each lens 72 receives a free space optical beam 76 directed thereto from its associated reflective microstructure 20 and focuses the optical beam 76 onto the section of optical fiber core 74 for transmission through the lid 62 and into the end of its associated optical fiber 14, 16.

Figure 8A:
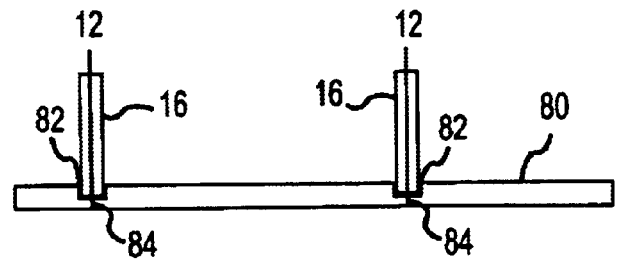
FIGS. 8A–B show an end view of a harness plate and an end view of a portion of a lid, respectively, of one embodiment of a single chip OXC in accordance with the present invention wherein the harness plate and the lid are configured to facilitate alignment of the optical fibers and to facilitate efficient transmission of optical signals between the optical fibers and the switch interfaces.
Figure 8B:
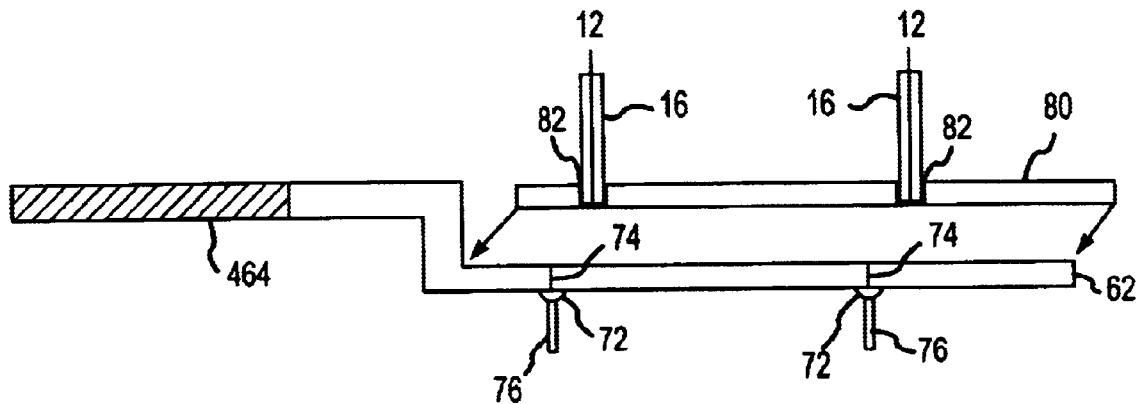

Referring now to FIGS. 8A–B, one alternative to providing holes 70 in the upper surface of the lid 62 is a fiber harness plate 80 that includes a plurality of holes 82. During assembly, the holes 82 in the harness plate 80 receive the ends of the optical fibers 14, 16. The holes 82 may extend completely through the harness plate 80 or they may only extend partially through the harness plate 80 with sections of optical fiber core 84 providing optical paths through the remainder of harness plate 80. The harness plate 80 fits onto the top of the lid 62 (or a portion of the lid 62 as is illustrated). The holes 82 are positioned to align the ends of the optical fibers 14, 16 with associated sections of optical fiber cores 74 and lenses 72 provided in and on the bottom of the lid 62, respectively, when the harness plate 80 is correctly aligned on the lid 62. It should be appreciated that although the harness plate 80 has been illustrated in connection with a lid 62 configured such as shown in FIG. 5B, the harness plate 80 may be configured to work with a lid 62 such as shown in FIG. 1B or any other appropriate lid to achieve accurate alignment of the optical fibers 14, 16 with their associated reflective microstructures.

Figure 9A:
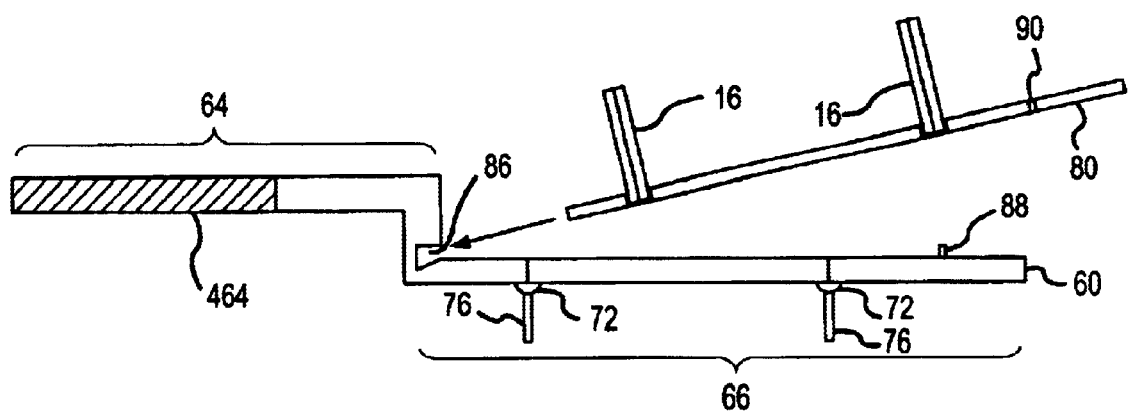
FIGS. 9A–B show end views illustrating attachment of one embodiment of a harness plate onto a correspondingly configured portion of a lid of a single chip OXC in accordance with the present invention.
Figure 9B:
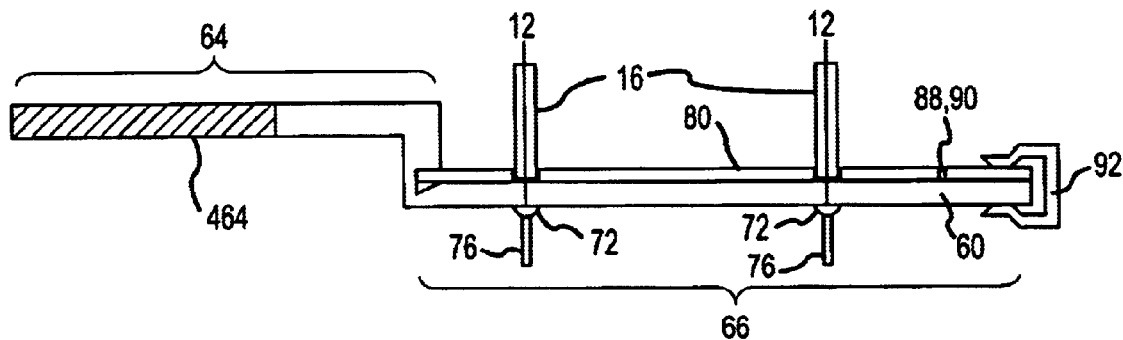
Figure 10A:
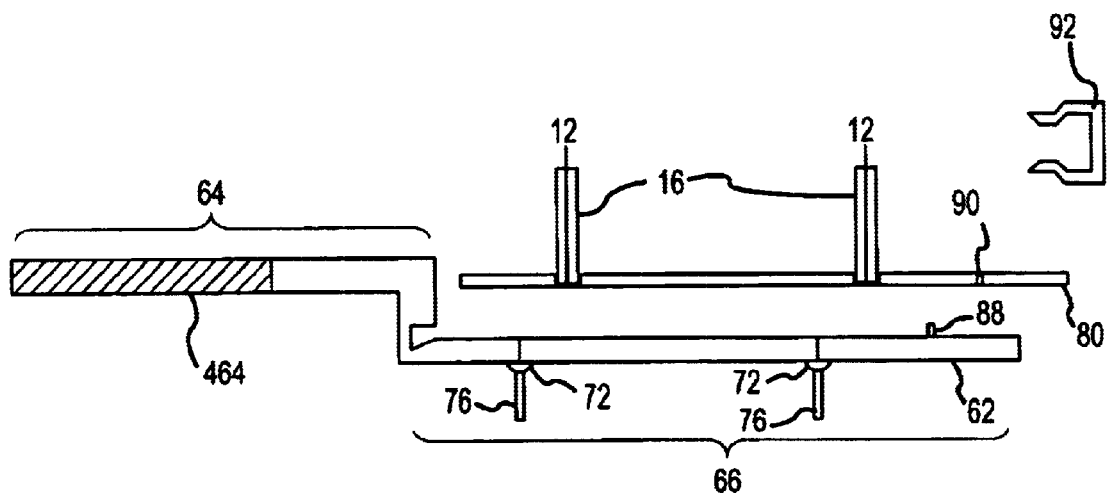
FIGS. 10A–B show end and top views, respectively, illustrating attachment of another embodiment of a harness plate onto a correspondingly configured portion of a lid of a single chip OXC in accordance with the present invention.
Figure 10B:
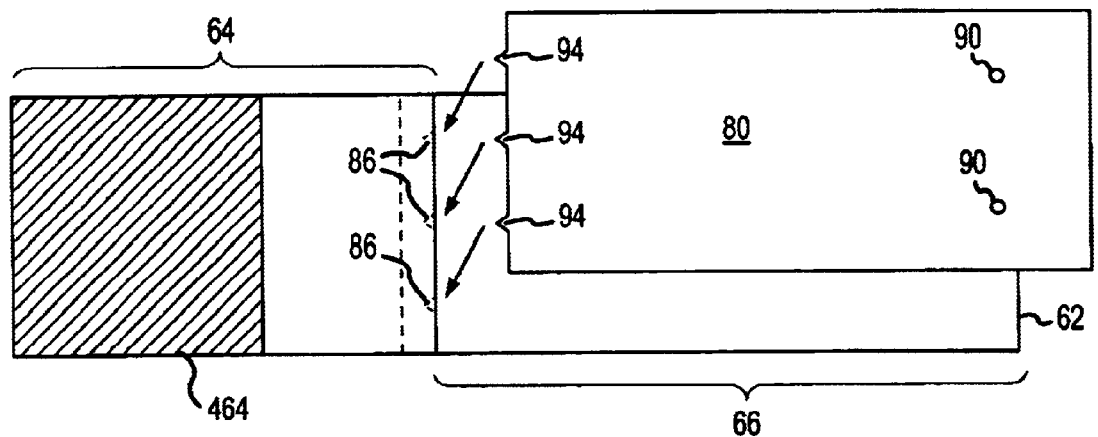
Figure 11A:
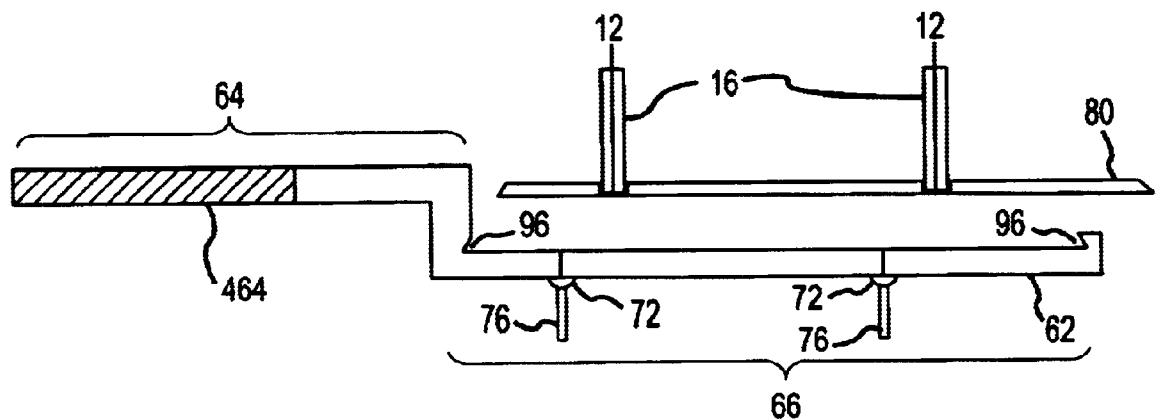
FIGS. 11A–B show end and top views, respectively, illustrating attachment of yet another embodiment of a harness plate onto a correspondingly configured portion of a lid of a single chip OXC in accordance with the present invention.
Figure 11B:
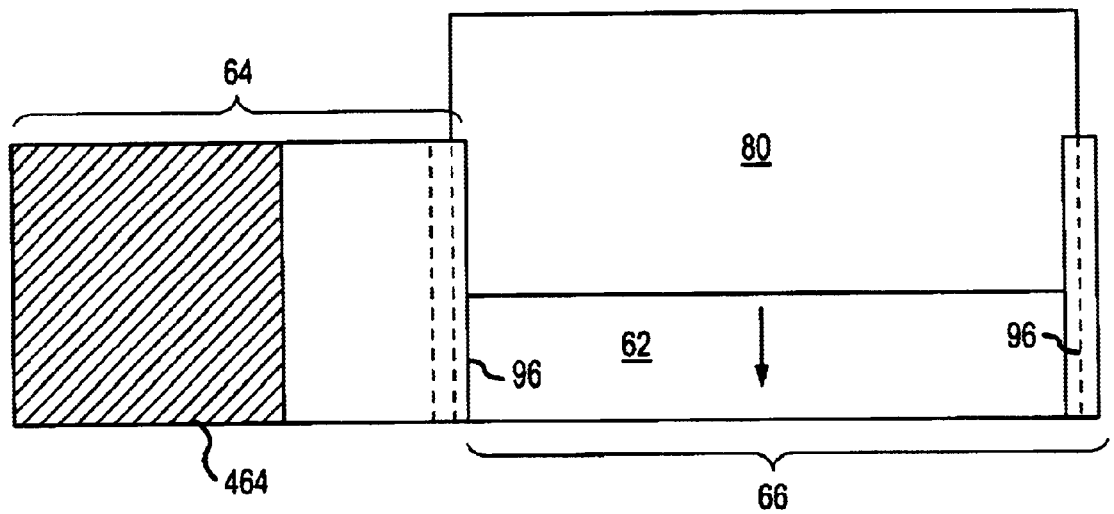

Referring now to FIGS. 9A–B, 10A–B and 11A–B, the harness plate 80 and/or the lid 62 may include pins, tapered pins, grooves, or other suitable alignment structures for assuring that the harness plate 80 is correctly aligned on the lid 62. For example, as is illustrated in FIGS. 9A–B, the lid 62 may include a notch 86 formed where the middle portion 64 of the lid 62 meets the side portion 66 of the lid 62 and one or more pins 88 that extend upward from the top of the side portion 66 of the lid 62. The notch 86 receives one edge of the harness plate 80 and the pins 88 are received in pin receiving holes 90 formed in the harness plate 80 when the harness plate 80 is correctly aligned on the lid 62. One or more clips 92 may be used to clamp the harness plate 80 firmly in place once it is correctly aligned. As is shown in FIGS. 10A–B, the notch 86 may also be configured for providing lateral alignment of the harness plate 80 on the lid 62 in two directions (e.g., side-to-side and back-to-front). In this regard, the geometry of the notch 86 may vary (e.g., the notch 86 may comprise a plurality of separate triangular notches 86) for receiving a correspondingly configured edge of the harness plate 80 (e.g., an edge having a plurality of separate triangular protrusions 94). By way of another example, as is shown in FIGS. 11A–B, the lid 62 may include a pair of parallel grooves 96. The edges of the harness plate 80 are correspondingly configured with the grooves 96 for sliding the harness plate 80 into position on the lid 62. The grooves 96 may include mechanical stops (not shown) for precisely stopping slideable movement of the harness plate 80 once it is correctly positioned on the lid 62.

Figure 12:
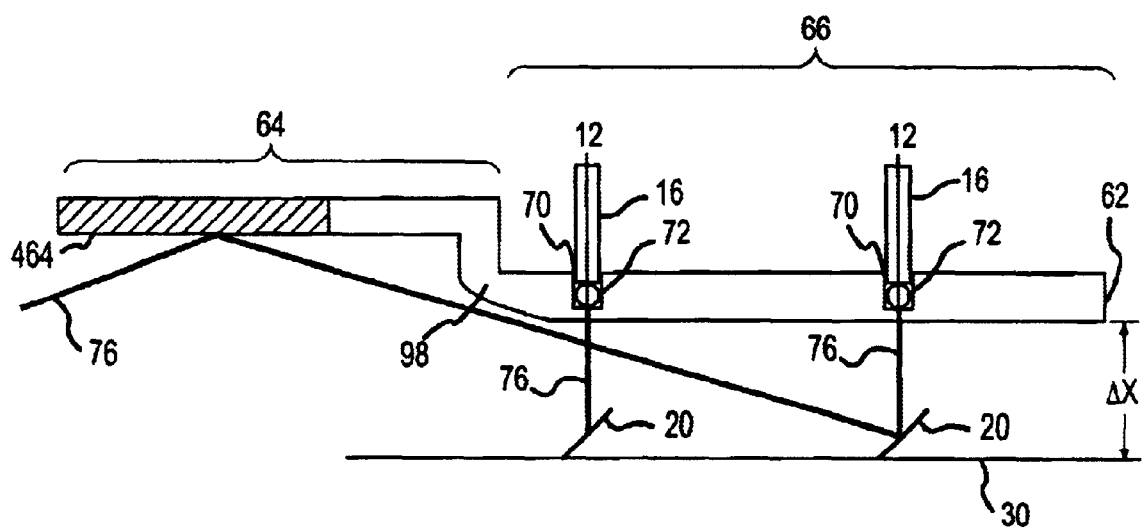
FIG. 12 shows an end view of a portion of a lid of a single chip OXC in accordance with the present invention having lenses disposed in fiber end receiving holes in the lid.
Figure 13:
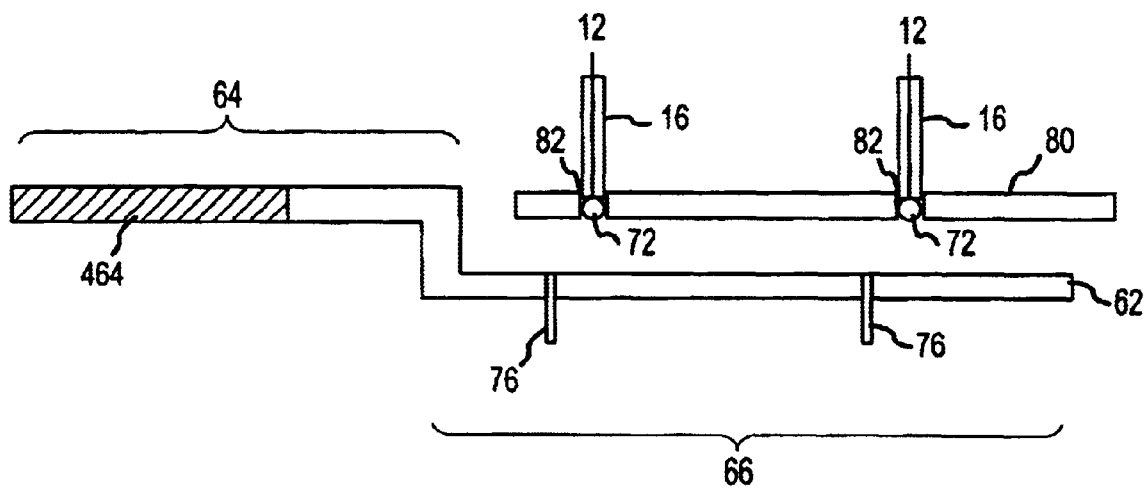
FIG. 13 shows an end view of a harness plate and an end view of a portion of a lid of a single chip OXC in accordance with the present invention having lenses disposed in fiber end receiving holes in the harness plate.

Referring to now to FIGS. 12–13, the lenses 72 may be positioned in other locations besides on the bottom surface of the lid 62. For example, as is shown in FIG. 12, the lenses 72 may comprise ball lenses that are disposed at the bottom of the fiber end receiving holes 70 in the lid 62. By way of another example, the lenses 72 may be attached to the fiber harness plate 80 instead of the lid 62. In this regard, the lenses 72 may comprise ball lenses disposed within the fiber end receiving holes 82 in the fiber harness plate 80. In this regard, the optical signals 12 pass through the lid 62, which may be configured to alter optical properties (e.g., polarization, bandwidth, etc.) of the optical signals 12 as they pass through the lid 62 on their way to or from the lenses 72.

Referring again to FIG. 12, where the lid 62 includes a reflective surface 464 on the underside of the middle portion 64 thereof such as described above in connection with FIGS. 5A–B, the lid 62 may be configured to provide for locating the side portions 66 of the lid 62, and hence the ends of the input and output optical fibers 14, 16, closer to the upper surface of the substrate 30 without interfering with the transmission of optical signals between the reflective surface 464 on the underside of the lid 62 and the reflective microstructures 20. In this regard, in the embodiment of the lid 62 shown in FIG. 5B, the corner 98 where the middle portion 64 of the lid 62 meets the side portion 66 of the lid 62 is square. Since the corner 98 is square, the lid 62 must be placed at a sufficient distance $\Delta X$ above the surface of the substrate 30 so that the corner 98 does not block the optical path between the outermost reflective microstructures 20 and the reflective surface 464. In the embodiment of the lid 62 shown in FIG. 12, the corner 98 where the middle portion 64 of the lid 62 meets the side portion 66 of the lid 62 is rounded instead of square, allowing the lid 62 to be placed at a distance $\Delta X$ that is less than the distance $\Delta X$ required with the square corner 98 of the lid shown in FIG. 5B in order to avoid blocking the optical path between the outermost reflective microstructures 20 and the reflective surface 464.

Figure 14:
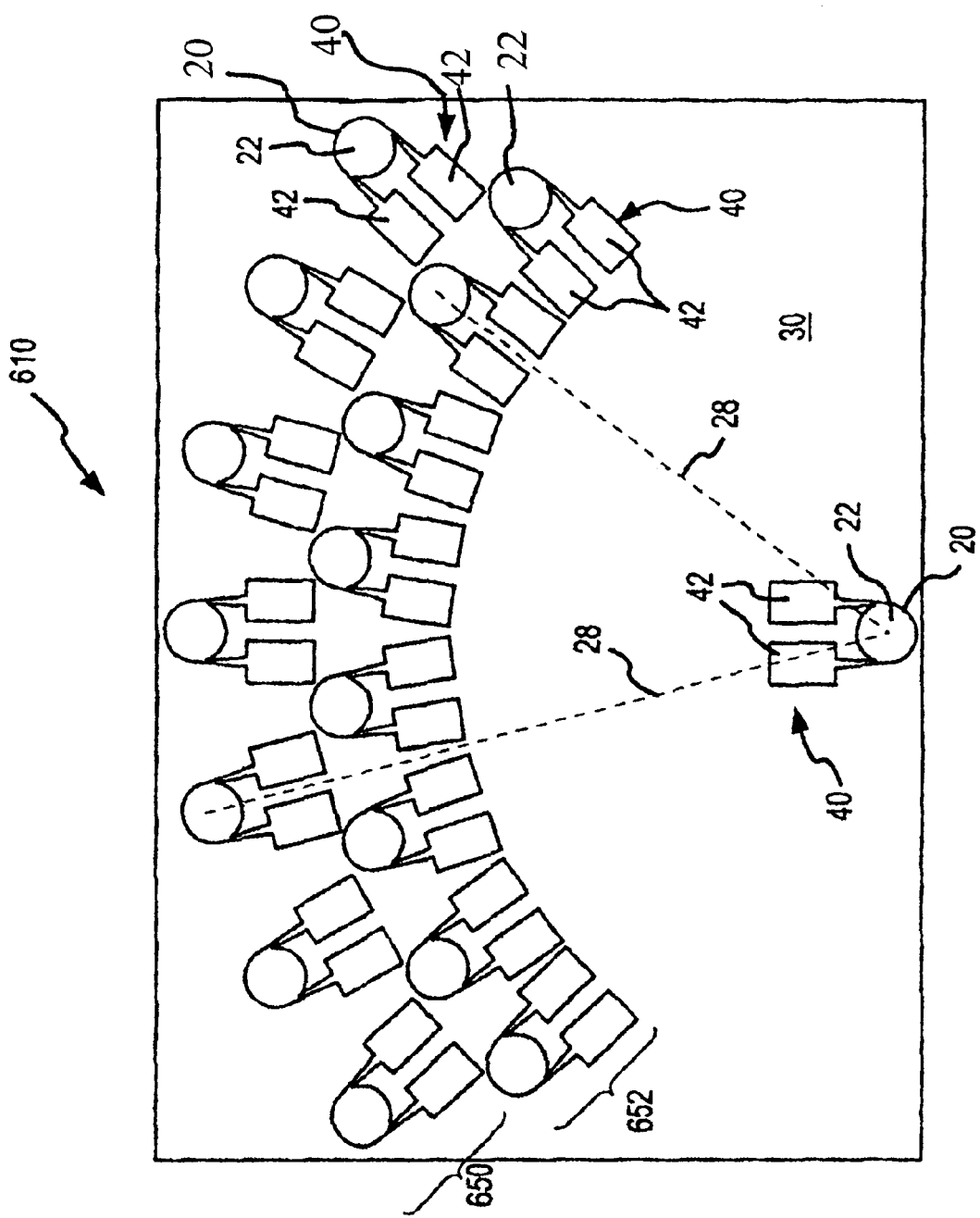
FIG. 14 shows a top view of one embodiment of a 1×N single chip OXC in accordance with the present intention.

Referring now to FIG. 14, there is shown a top view of one embodiment of a 1×N single chip OXC 610 in accordance with the present intention where N=15. The 1×N single chip OXC 610 is configured for switching optical signals 12 between a single input optical fiber 14 and N output optical fibers 14. The 1×N single chip OXC 610 includes a single input reflective microstructure 20 that is associated with the single input optical fiber 14 and N output reflective microstructures 20 that are associated with the N output optical fibers 16. The output reflective microstructures 20 are arranged on the substrate 30 in an outer arc 650 and an inner arc 652. The single input reflective microstructure 20 is located on the concave side of the outer and inner arcs 650, 652. Depending upon factors such as the size of the substrate 30 and the number N of output optical fibers 16, the output reflective microstructures 20 may be arranged in only one arc, two arcs as shown, or three or more arcs. Where there is more than one arc (e.g. outer and inner arcs 650, 652), the multiple arcs together comprise an array of arcs.

Arranging the output reflective microstructures in one or more arcs achieves several advantages. The positioning system 40 associated with the single input reflective microstructure 20 is operable to tilt the single input reflective microstructure 20 with two degrees of freedom in order to orient its reflective surface 22 for directing/receiving optical signals to/from any one of the output reflective microstructures 20. However, the output reflective microstructures 20 need only be tiltable with one degree of freedom (i.e., each output reflective microstructure 20 only needs to tilt about an axis orthogonal to a radii extending from the single input reflective microstructure 20 to such output reflective microstructure 20). This simplifies operation of the positioning systems 40 associated with the output reflective microstructures 20. For example, the positioning systems 40 associated with the output reflective microstructures 20 may be configured to lift and tilt the output reflective microstructures 20 with a single control signal to a predetermined required orientation and lock in place. In other embodiments, the output reflective microstructures 20 may be arranged in parallel rows or the like, in which case the positioning systems 40 associated therewith need to be operable to tilt the output reflective microstructures 20 with two degrees of freedom. Further, if the outer and inner arcs 650, 652 are circular, the optical path 28 from the single input reflective microstructure 20 to any output reflective microstructure 20 in the same arc 650, 652 is the same distance regardless of where the output reflective microstructure 20 is located in such arc 650, 652.

As is shown in FIG. 14, the output reflective microstructures 20 may be arranged in a staggered manner within the outer and inner arcs 650, 652. In this regard, alternating output reflective microstructures 20 within the outer and inner arcs 650, 652 may be located at alternating angular intervals with respect to the single input reflective microstructure 20. For example, the output reflective microstructures 20 in the inner arc 652 may be located at +/−5°, +/−15°, +/−25°, +/−35°, etc., whereas the output reflective microstructures 20 in the outer arc 650 may be located at 0°, +/−10°, +/−20°, +/−30°, etc. The required angular intervals will vary depending upon factors such as the radial distance from the single output reflective microstructure 20 to the arcs 650, 652 and the size of the output reflective microstructures 20. Staggering the output reflective microstructures 20 in the outer and inner arcs 650, 652 allows the output reflective microstructures 20 within the inner arc 652 to remain elevated during switching of an optical signal 12 to/from an output reflective microstructure 20 in the outer arc 650 because the optical path 28 between the single input reflective microstructure 20 and the target output reflective microstructure 20 passes between adjacent elevated output reflective microstructures 20 in the inner arc 652.

There are several alternatives to staggering the output reflective microstructures 20 within the outer and inner arcs 650, 652 which permit unrestricted optical paths 28 to/from the output reflective microstructures 20 in the outer arc 650. For example, the positioning systems 40 associated with the output reflective microstructures 20 in the outer arc 650 may incorporate longer A-frame structures 914 for lifting the output reflective microstructures 20 in the outer arc 650 above the output reflective microstructures 20 in the inner arc 652. Another alternative, is to fabricate the output reflective microstructures 20 on a multilevel substrate 30 wherein the outer arc 650 of output reflective microstructures 20 is located on a higher level of the substrate 30 than the inner arc 652 of output reflective microstructures 20. A third alternative is to utilize a reflective surface 464 on the underside of a lid 62 for covering the substrate 30 such as described in connection with FIGS. 5A–B. A fourth alternative is to actuate only the target output reflective microstructure 20 while leaving the remaining output reflective microstructures 20 flat on the substrate 30 to allow the optical signal 12 to pass over them. Such alternatives may be employed where it is not possible to sufficiently stagger the output reflective microstructures 20 such as when the radial distance to the arcs 650, 652 is very short, the output reflective microstructures 20 are large, or there are many arcs of output reflective microstructures 20.

In addition to functioning as a 1×N OXC, the single chip OXC 610 shown in FIG. 14 can also be operated to switch an optical signal 12 from any one of the N output optical fibers 16 to any other one of the N output optical fibers 16. In this regard, the single input reflective microstructure 20 may be utilized as an intermediate reflector by appropriately orienting its reflective surface 22 to receive an optical signal 12 from the output reflective microstructure 20 associated with the output optical fiber 16 from which the optical signal 12 to be switched is emitted and reflect such optical signal 12 to a target output reflective microstructure 20 associated with the desired output optical fiber 16.

Figure 15:
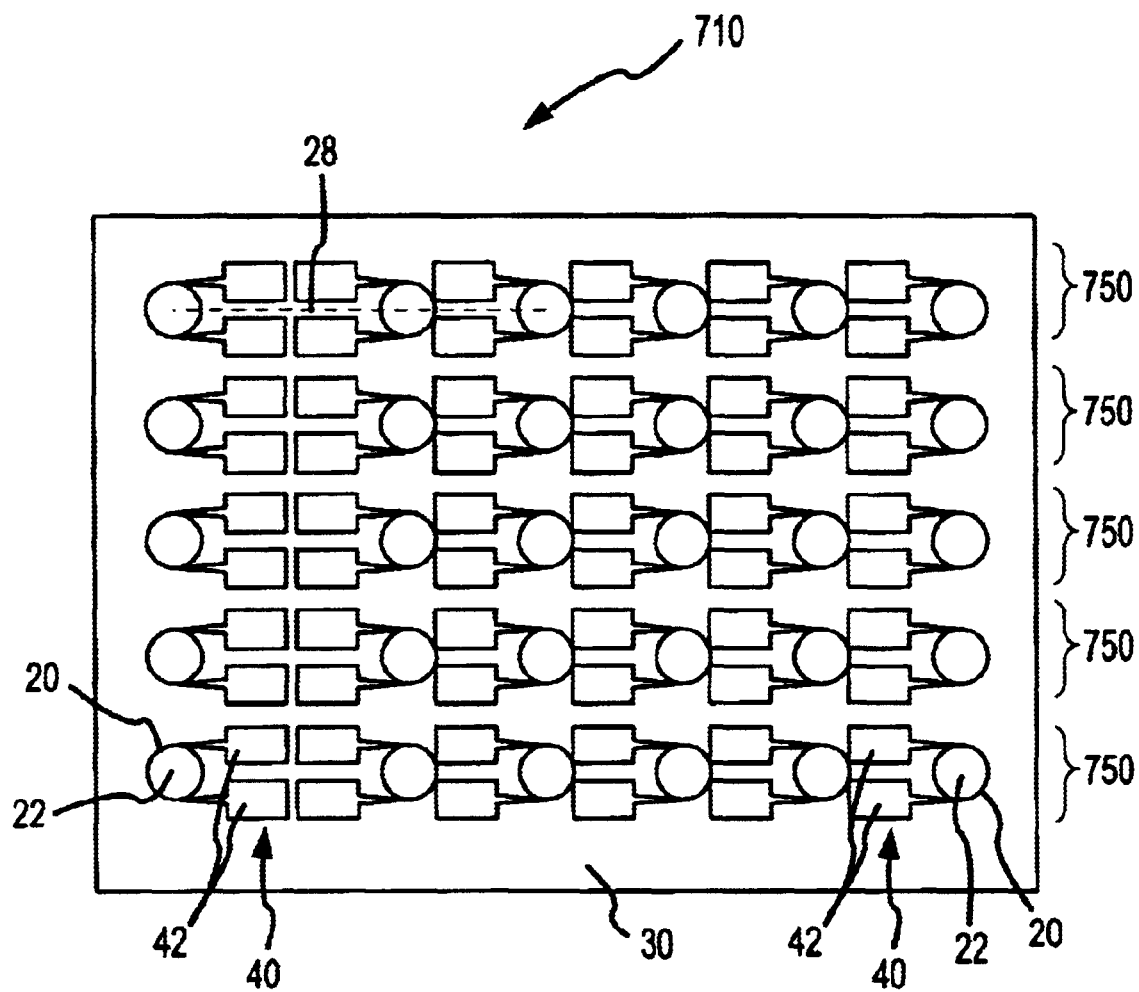
FIG. 15 shows a top view of one embodiment of a single chip multiple 1×N OXC in accordance with the present invention.

Referring now to FIG. 15, there is shown a top view of one embodiment of a single chip multiple 1×N OXC 710 in accordance with the present invention where N=5. The single chip multiple 1×N OXC 710 includes an array of adjacent 1×N OXCs fabricated on a common substrate 30 that are each capable of switching optical signals 12 between a single input optical fiber 14 and any one of N output optical fibers 16. Each 1×N OXC comprises a single input reflective microstructure 20 and five output reflective microstructures 20 aligned in a separate row 750 on the substrate 30. Since the reflective microstructures 20 are aligned in a row 750, the positioning systems 40 associated with the single input reflective microstructure 20 and the output reflective microstructures 20 need only be operable to tilt the reflective microstructures 20 with one degree of freedom (i.e. about an axis substantially orthogonal to a centerline of the row 750).

To simplify positioning and control of the reflective microstructures 20, the positioning systems 40 associated with the output reflective microstructures 20 may be configured to lift and tilt the output reflective microstructures 20 with a single control signal to a predetermined required orientation and lock in place. The single input reflective microstructure 20 may then be tilted as needed. In this regard, an additional reflective surface 464 formed on the underside of a lid 62 for covering the substrate 30 such as described in connection with FIGS. 5A–B may be employed in order to provide and unrestricted optical path 28 from the input reflective microstructure 20 to any one of the elevated and locked output reflective microstructures 20. Alternatively, the positioning systems 40 of the output reflective microstructures 20 can incorporate successively longer A-frame structures 914 proceeding down the row from the single input reflective microstructure 20 so that each output reflective microstructure 20 is elevated above the output reflective microstructures 20 between its location and the single input reflective microstructure 20. Another alternative is to fabricate the reflective microstructures 20 on a multilevel substrate 30 with each output reflective microstructure 20 being located on a higher level proceeding down the row 750 away from the single input reflective microstructure 20.

It is also possible to provide an unrestricted optical path 28 from the input reflective microstructures 20 to any one of the output reflective microstructures 20 by only elevating and tilting the target output reflective microstructure 20 while keeping the remaining output reflective microstructures 20 flat on the substrate. In this regard, the single input reflective microstructure 20 may be elevated and tilted to a predetermined orientation where it is locked in place and only the output reflective microstructures 20 are elevated and tilted as needed.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. An optical cross connect for switching optical signals between a plurality of optical ports, said optical cross connect comprising:
    a substrate having a first surface facing the optical ports;
    a plurality of reflective microstructures formed on the first surface of said substrate, each said reflective microstructure being associated with one of said optical ports and including an optically reflective surface; and
    a free space switch interface defined between the optical ports and the first surface of said substrate with the optical ports being on a first side of said free space switch interface and said reflective microstructures being on a second side of said free space switch interface opposite the first side;
    each said reflective microstructure being positionable to orient its reflective surface to reflect an optical signal receivable from its associated optical port directly to the reflective surface of at least one other one of said reflective microstructures;
    each said reflective microstructure being positionable to orient its reflective surface to reflect an optical signal receivable directly from at least one other one of said reflective microstructures to its associated optical port.

2. The optical cross connect of claim 1 further comprising:
    a plurality of positioning systems, each said positioning system being associated with one of said reflective microstructures and operable to elevate its associated reflective microstructure from the first surface of said substrate and tilt its associated reflective microstructure with at least two degrees of freedom with respect to the first surface of said substrate.

3. The optical cross connect of claim 2 wherein said reflective microstructures are arranged on said substrate and said positioning systems are configured to align a center of the reflective surface of each said reflective microstructure with a central axis of its associated optical port when said reflective microstructure is elevated at a specified height from the first surface of said substrate.

4. The optical cross connect of claim 1 wherein the reflective surfaces of said reflective microstructures are one of circular and elliptical.

5. The optical cross connect of claim 1 further comprising:
    a lid positionable between the optical ports and the first surface of said substrate, said lid being configured for permitting transmission of optical signals therethrough between each optical port and its associated reflective microstructure.

6. The optical cross connect of claim 5 wherein the optical ports comprise optical fiber ends.

7. The optical cross connect of claim 6 further comprising:
    a plurality of holes within which the optical fiber ends are receivable formed on a side of said lid facing away from the first surface of said substrate, said holes being arranged on the lid to align the optical fiber ends with said reflective microstructures.

8. The optical cross connect of claim 7 further comprising:
    a plurality of lenses disposed on a side of said lid facing the first surface of said substrate, said lenses being arranged on the lid in a manner corresponding with said holes.

9. The optical cross connect of claim 8 further comprising:
    a plurality of optical fiber cores disposed within the lid, each said optical fiber core extending between one of said holes and one of said lenses.

10. The optical cross connect of claim 6 further comprising:
    at least one plate attachable to said lid, said at least one plate including a plurality of holes within which the optical fiber ends are receivable formed on a side of said at least one plate facing away from the first surface of said substrate, the holes being arranged on said at least one plate to align the optical fiber ends with the reflective microstructures when said at least one plate is attached on said lid.

11. The optical cross connect of claim 5 wherein said substrate and said lid comprise a hermetically sealed package.

12. An optical cross connect for switching an optical signal between a first plurality of optical ports and a second plurality of optical ports, said optical cross connect comprising:
    a substrate having a first surface facing the first and second pluralities of optical ports;
    a first plurality of reflective microstructures formed on the first surface of said substrate, each said reflective microstructure of said first plurality of reflective microstructures being associated with one of the first plurality of optical ports and including an optically reflective surface;
    a second plurality of reflective microstructures formed on the first surface of said substrate, each said reflective microstructure of said second plurality of reflective microstructures being associated with one of the second plurality of optical ports and including an optically reflective surface; and
    a free space switch interface defined between the optical ports and the first surface of said substrate with the optical ports being on a first side of said free space switch interface and said reflective microstructures being on a second side of said free space switch interface opposite the first side;
    each said reflective microstructure of said first plurality of reflective microstructures being positionable to orient its reflective surface to reflect an optical signal receivable from its associated optical port directly to the reflective surface of at least one of said reflective microstructures of said second plurality of reflective microstructures and to reflect an optical signal receivable directly from the reflective surface of at least one of said reflective microstructures of said second plurality of reflective microstructures to its associated optical port;
    each said reflective microstructure of said second plurality of reflective microstructures being positionable to orient its reflective surface to reflect an optical signal receivable directly from the reflective surface of at least one of said reflective microstructures of said first plurality of reflective microstructures to its associated optical port and to reflect an optical signal receivable from its associated optical port directly to the reflective surface of at least one of said reflective microstructures of said first plurality of reflective microstructures.

13. The optical cross connect of claim 12 further comprising:
    a plurality of positioning systems, each said positioning system being associated with one of said reflective microstructures and operable to elevate its associated reflective microstructure from the first surface of said substrate and tilt its associated reflective microstructure with at least two degrees of freedom with respect to the first surface of said substrate.

14. The optical cross connect of claim 13 wherein said reflective microstructures are arranged on said substrate and said positioning systems are configured to align a center of the reflective surface of each said reflective microstructure of said first and second pluralities of reflective microstructures with a central axis of its associated optical port when said reflective microstructure is elevated at a specified height from the first surface of said substrate.

15. The optical cross connect of claim 13 wherein said each said positioning system is oriented on said substrate such that a range of a required tilt angle of its associated reflective microstructure is symmetric about an axis of symmetry of such positioning system.

16. The optical cross connect of claim 12 wherein said first and second pluralities of reflective microstructures are arranged in a plurality of parallel rows on said substrate.

17. The optical cross connect of claim 16 wherein said reflective microstructures within an outer one of said rows are elevatable to a greater height from the first surface of said substrate than said reflective microstructures within an inner one of said rows.

18. The optical cross connect of claim 12 wherein said first and second pluralities of reflective microstructures are arranged in a plurality of arcs on said substrate.

19. The optical cross connect of claim 12 wherein the reflective surfaces of said reflective microstructures of said first and second pluralities of reflective microstructures are one of circular and elliptical.

20. The optical cross connect of claim 12 further comprising:
a lid positionable between the optical ports and the first surface of said substrate, said lid being configured for permitting transmission of optical signals therethrough between each optical port and its associated reflective microstructure.

21. The optical cross connect of claim 20 wherein the first and second pluralities of optical ports comprise optical fiber ends.

22. The optical cross connect of claim 21 further comprising:
a plurality of holes within which the optical fiber ends are receivable formed on a side of said lid facing away from the first surface of said substrate, said holes being arranged on the lid to align the optical fiber ends with said reflective microstructures.

23. The optical cross connect of claim 22 further comprising:
a plurality of lenses, said lenses being disposed in said holes formed in said lid.

24. The optical cross connect of claim 22 further comprising:
a plurality of lenses disposed on a side of said lid facing the first surface of said substrate, said lenses being arranged on the lid in a manner corresponding with said holes.

25. The optical cross connect of claim 24 further comprising:
a plurality of optical fiber cores disposed within the lid, each said optical fiber core extending between one of said holes and one of said lenses.

26. The optical cross connect of claim 21 further comprising:

at least one plate attachable to said lid, said at least one plate including a plurality of holes within which the optical fiber ends are receivable formed on a side of said at least one plate facing away from the first surface of said substrate, the holes being arranged on said at least one plate to align the optical fiber ends with the reflective microstructures when said at least one plate is attached on said lid.

27. The optical cross connect of claim 26 further comprising:
a plurality of lenses, said lenses being disposed in said holes formed in said at least one plate.

28. The optical cross connect of claim 26 further comprising:
an alignment structure configured to ensure correct alignment of said at least one plate on said lid when attaching said at least one plate to said lid.

29. The optical cross connect of claim 28 wherein said alignment structure comprises at least one of a notch, a groove, and a pin formed on at least one of said lid and said plate.

30. The optical cross connect of claim 12 wherein an arrangement of said first and second pluralities of reflective microstructures on said substrate comprises a single die formed on said substrate, and wherein a plurality of identical dies are formed on said substrate.

31. The optical cross connect of claim 30 wherein said dies are arranged relative to one another such that at least one reflective microstructure of each said die is positionable to reflect an optical signal to at least one reflective microstructure of at least one other die.

32. The optical cross connect of claim 31 wherein said dies are arranged in a side-by-side manner on said substrate.

33. An optical cross connect for switching an optical signal between a first plurality of optical ports and a second plurality of optical ports, said optical cross connect comprising:
a substrate having a first surface facing the first and second pluralities of optical ports;
a first plurality of reflective microstructures formed on the first surface of said substrate, each said reflective microstructure of said first plurality of reflective microstructures being associated with one of the first plurality of optical ports and including an optically reflective surface, wherein the number of reflective microstructures in the first plurality of reflective microstructures equals the number of optical ports in the first plurality of optical ports;
a second plurality of reflective microstructures formed on the first surface of said substrate, each said reflective microstructure of said second plurality of reflective microstructures being associated with one of the second plurality of optical ports and including an optically reflective surface, wherein the number of reflective microstructures in the second plurality of reflective microstructures equals the number of optical ports in the second plurality of optical ports;
an optically reflective area facing and spaced away from the first surface of said substrate, said optically reflective area being positioned between the first and second pluralities of optical ports to reflect an optical signal between the optically reflective surface of any one of said reflective microstructures of said first plurality of reflective microstructures and the optically reflective surface of any one of said reflective microstructures of said second plurality of reflective microstructures;

a lid positionable between the optical ports and the first surface of said substrate, said lid being configured for permitting transmission of optical signals therethrough between each optical port and its associated reflective microstructure, said lid having said optically reflective area formed on a side of said lid facing the first surface of said substrate; and at least one plate attachable to said lid, said at least one plate including a plurality of holes within which a plurality of optical fiber ends are receivable formed on a side of said at least one plate facing away from the first surface of said substrate, the holes being arranged on said at least one plate to align the optical fiber ends with the reflective microstructures when said at least one plate is attached on said lid;

each said reflective microstructure of said first and second pluralities of reflective microstructures being positionable to orient its reflective surface to reflect an optical signal receivable from its associated optical port to the optically reflective area and to reflect an optical signal receivable from the optically reflective area to its associated optical port.

34. The optical cross connect of claim 33 further comprising:

a plurality of positioning systems, each said positioning system being associated with one of said reflective microstructures and operable to elevate its associated reflective microstructure from the first surface of said substrate and tilt its associated reflective microstructure with at least two degrees of freedom with respect to the first surface of said substrate.

35. The optical cross connect of claim 35 further comprising:

a plurality of holes within which the optical fiber ends are receivable formed on a side of said lid facing away from the first surface of said substrate, said holes being arranged on the lid to align the optical fiber ends with said reflective microstructures.

36. The optical cross connect of claim 35 further comprising:

a plurality of lenses disposed on a side of said lid facing the first surface of said substrate, said lenses being arranged on the lid in a manner corresponding with said holes.

37. The optical cross connect of claim 31 further comprising:

a plurality of optical fiber cores disposed within the lid, each said optical fiber core extending between one of said holes and one of said lenses.

38. The optical cross connect of claim 33 wherein said optically reflective area is configured to modify optical properties of an optical signal reflected therefrom.

39. The optical cross connect of claim 38 wherein said optical properties include polarization.

40. The optical cross connect of claim 33 further comprising a light-sensitive structure configured and positioned for detecting the locations of optical signals incident thereon.

41. An optical cross connect for switching optical signals between a plurality of optical ports, said optical cross connect comprising:

a substrate having a first surface facing the optical ports;

a plurality of first means formed on said substrate for reflecting optical signals incident thereon, each said first means being associated with one of the optical ports;

a free space switch interface defined between the optical ports and the first surface of said substrate with the optical ports being on a first side of said free space switch interface and said first means being on a second side of said free space switch interface opposite the first side; and a plurality of second means formed on said substrate for orienting each said first means to direct an optical signal receivable from its associated optical port directly to at least one other one of said first means and orienting each said first means to direct an optical signal receivable directly from at least one other one of said first means to its associated optical port.

42. The optical cross connect of claim 41 wherein each said first means comprises a positionable reflective microstructure.

43. The optical cross connect of claim 42 wherein each said second means comprises a positioning system, each said positioning system being associated with one of said reflective microstructures and operable to elevate its associated reflective microstructure from the first surface of said substrate and tilt its associated reflective microstructure with at least two degrees of freedom with respect to the first surface of said substrate.

44. The optical cross connect of claim 41 wherein the plurality of optical ports comprise optical fiber ends.

45. The optical cross connect of claim 44 further comprising:

means for covering said first surface of said substrate; and means for aligning the optical fiber ends with said first means.

46. The optical cross connect of claim 45 wherein said means for covering comprise a lid positionable between the optical ports and the first surface of said substrate, said lid being configured for permitting transmission of optical signals therethrough between each optical fiber end and its associated first means, and wherein said means for aligning comprise a plurality of holes within which the optical fiber ends are receivable, said holes being formed on a side of said lid facing away from the first surface of said substrate, said holes being arranged on the lid to align the optical fiber ends with said first means.

47. The optical cross connect of claim 45 wherein said means for covering comprise a lid positionable between the optical fiber ends and the first surface of said substrate, said lid being configured for permitting transmission of optical signals therethrough between each optical fiber end and its associated first means, and wherein said means for aligning comprise at least one plate attachable to said lid, said at least one plate including a plurality of holes within which the optical fiber ends are receivable formed on a side of said at least one plate facing away from the first surface of said substrate, the holes being arranged on said at least one plate to align the optical fiber ends with said first means when said at least one plate is attached on said lid.

48. The optical cross connect of claim 44 further comprising:

means, associated with each optical fiber end, for forming a free space optical beam from an optical signal transmittable from each said optical fiber end and focusing a free space optical beam onto each said optical fiber end.

49. The optical cross connect of claim 48 wherein said means for forming a free space optical beam comprises a lens associated with each optical fiber end.

50. An optical cross connect for switching optical signals between a plurality of optical ports, said optical cross connect comprising;

a substrate having a first surface facing the optical ports;

a plurality of reflective microstructures formed on the first surface of said substrate, each said reflective microstructure being associated with one of the optical ports and including an optically reflective surface;

a plurality of positioning systems formed on the first surface of said substrate, each said positioning system being associated with one of said reflective microstructures and operable to elevate its associated reflective microstructure from the first surface of said substrate and tilt its associated reflective microstructure with at least two degrees of freedom with respect to the first surface of said substrate;

at least one positioning system including a first lever arm of a first length having a first end thereof attached to its associated reflective microstructure and a second end thereof attached to said substrate, said first lever arm of a first length being pivotable about its second end; and at least one positioning system including a second lever arm of a second length having a first end thereof attached to its associated reflective microstructure and a second end thereof attached to said substrate, said second lever arm of a second length being pivotable about its second end;

said first and second lengths being different wherein pivoting of said first and second lever arms through the same angular displacement achieves different vertical displacement of the first ends of said first and second lever arms with respect to the first surface of said substrate.

51. The optical cross connect of claim 50 wherein said first length is between 500 microns and 1000 microns, and wherein said second length is between 1000 microns and 1500 microns.

52. The optical cross connect of claim 50 wherein said first and second lever arms are coupled with electrostatic actuators operable to effect pivoting of said first and second lever arms about the second ends thereof.

53. The optical cross connect of claim 50 wherein said reflective microstructures are arranged in a plurality of rows on the first surface of said substrate, and wherein positioning systems associated with reflective microstructures in a first one of said rows include first lever arms of a first length and wherein positioning systems associated with reflective microstructures in a second one of said rows include second lever arms of a second length.

54. The optical cross connect of claim 50 wherein said reflective microstructures are arranged in a plurality of arcs on the first surface of said substrate, and wherein positioning systems associated with reflective microstructures in a first one of said arcs include first lever arms of a first length and wherein positioning systems associated with reflective microstructures in a second one of said arcs include second lever arms of a second length.

55. An optical cross connect for switching an optical signal between a first optical port and any one of a plurality of second optical ports, said optical cross connect comprising:

a substrate having a surface facing the first optical port and the plurality of second optical ports;

a first reflective microstructure formed on the surface of said substrate, said first reflective microstructure being associated with the first optical port and including an optically reflective surface;

a plurality of second reflective microstructures formed on the surface of said substrate, each said second reflective microstructure being associated with one of said second optical ports and including an optically reflective surface; and a free space switch interface defined between the optical ports and the surface of said substrate with the optical ports being on a first side of said free space switch interface and said reflective microstructures being on a second side of said free space switch interface opposite the first side;

said first reflective microstructure being positionable to orient its reflective surface to reflect an optical signal receivable from the first optical port directly to the reflective surface of any one of said second reflective microstructures and to reflect an optical signal receivable directly from the reflective surface of any one of said second reflective microstructures to the first optical port;

each said second reflective microstructure being positionable to orient its reflective surface to reflect an optical signal receivable directly from said first reflective microstructure to its associated optical port and to reflect an optical signal receivable from its associated optical port directly to said first reflective microstructure.

56. The optical cross connect of claim 55 wherein said second reflective microstructures are arranged in at least one arc, said first reflective microstructure being located on a concave side of said arc.

57. The optical cross connect of claim 56 wherein said second reflective microstructures are positionable with only one degree of freedom.

58. The optical cross connect of claim 56 wherein said second reflective microstructures are arranged in an outer and an inner arc.

59. The optical cross connect of claim 58 wherein said second reflective microstructures in the inner and outer arcs are located at different angular locations with respect to said first reflective microstructure.

60. An optical cross connect switch, comprising:

a support;

a plurality of first input mirror microstructures disposed within a first row on a first side of a first reference axis;

a first pivot member for each of said first input mirror microstructures, wherein each said first pivot member interconnects its corresponding said first input mirror microstructure with said support, and wherein each said first pivot member is of a first length;

a plurality of second input mirror microstructures disposed within a second row on said first side of said first reference axis in spaced relation to said first row such that said first row is disposed between said second row and said first reference axis;

a second pivot member for each of said second input mirror microstructures, wherein each said second pivot member interconnects its corresponding said second input mirror microstructure with said support, and wherein each said second pivot member is of a second length different from said first length;

a plurality of first output mirror microstructures disposed within a third row on a second side of said first reference axis that is opposite said first side;

a third pivot member for each of said first output mirror microstructures, wherein each said third pivot member interconnects its corresponding said first output mirror microstructure with said support, and wherein each said third pivot member is of a third length;

a plurality of second output mirror microstructures disposed within a fourth row on said second side of said first reference axis in spaced relation to said third row such that said third row is disposed between said fourth row and said first reference axis; and a fourth pivot member for each of said second output mirror microstructures, wherein each said fourth pivot member interconnects its corresponding said second output mirror microstructure with said support, and wherein each said fourth pivot member is of a fourth length different from said third length.

61. A switch, as claimed in claim 60, wherein:

said support comprises a single, common substrate.

62. A switch, as claimed in claim 60, wherein:

said first, second, third, and fourth rows are disposed in a parallel relation.

63. A switch, as claimed in claim 60, wherein:

said first and second input mirror microstructures pivot away from said support in a direction of said first and second output mirror microstructures, and wherein said first and second output mirror microstructures pivot away from said support in a direction of said first and second input mirror microstructures.

64. A switch, as claimed in claim 60, wherein:

a second reference axis is perpendicular to said first reference axis, wherein a magnitude of a first acute angle between said first reference axis and each said first pivot member is decreased for each said first pivot member that is disposed further from said second reference axis, wherein a magnitude of a second acute angle between said first reference axis and each said second pivot member is decreased for each second pivot member that is disposed further from said second reference axis, wherein a magnitude of a third acute angle between said first reference axis and each said third pivot member is decreased for each said third pivot member that is disposed further from said second reference axis, and wherein a magnitude of a fourth acute angle between said first reference axis and each said fourth pivot member is decreased for each said fourth pivot member that is disposed further from said second reference axis.

65. A switch, as claimed in claim 60, wherein said second length is greater than said first length and wherein said fourth length is greater than third length.

66. A switch, as claimed in claim 60, wherein said first and third lengths are the same and wherein said second and fourth lengths are the same.

67. A switch, as claimed in claim 60, further comprising:

an optically reflective area spaced away from said support, said optically reflective area being positioned laterally to have portions thereof on both the first and second sides of said first reference axis, wherein optical signals are reflectable between any one of the first and second input mirror microstructures and any one of the first and second output mirror microstructures via said optically reflective area.

68. A switch, as claimed in claim 67, further comprising:

a lid positionable over said support, said lid having said optically reflective area formed on a side of said lid facing said support.

69. An optical cross connect switch, comprising:

a support having a surface;

a plurality of first input mirror microstructures disposed within a first row on a first side of a first reference axis defined on the surface of said support;

an input pivot member for each of said input mirror microstructures, wherein each said input pivot member interconnects its corresponding said input mirror microstructure with said support;

a plurality of output mirror micro structures disposed within a second row on a second side of said first reference axis that is opposite said first side; and an output pivot member for each of said output mirror microstructures, wherein each said output pivot member interconnects its corresponding said output mirror microstructure with said support, wherein a second reference axis defined on the surface of said support is perpendicular to said first reference axis, wherein a magnitude of a first acute angle defined on the surface of said support between said first reference axis and each said input pivot member is decreased for each said input pivot member that is disposed further from said second reference axis, and wherein a magnitude of a second acute angle defined on the surface of said support between said first reference axis and each said output pivot member is decreased for each said output pivot member that is disposed further from said second reference axis.

70. An optical cross connect for switching an optical signal between a first plurality of optical ports and a second plurality of optical ports, said optical cross connect comprising:

a substrate having a first surface facing the first and second pluralities of optical ports;

a first plurality of reflective microstructures formed on the first surface of said substrate, each said reflective microstructure of said first plurality of reflective microstructures being associated with one of the first plurality of optical ports and including an optically reflective surface; and a second plurality of reflective microstructures formed on the first surface of said substrate, each said reflective microstructure of said second plurality of reflective microstructures being associated with one of the second plurality of optical ports and including an optically reflective surface;

each said reflective microstructure of said first plurality of reflective microstructures being positionable to orient its reflective surface to reflect an optical signal receivable from its associated optical port to the reflective surface of at least one of said reflective microstructures of said second plurality of reflective microstructures and to reflect an optical signal receivable from the reflective surface of at least one of said reflective microstructures of said second plurality of reflective microstructures to its associated optical port;

each said reflective microstructure of said second plurality of reflective microstructures being positionable to orient its reflective surface to reflect an optical signal receivable from the reflective surface of at least one of said reflective microstructures of said first plurality of reflective microstructures to its associated optical port and to reflect an optical signal receivable from its associated optical port to the reflective surface of at least one of said reflective microstructures of said first plurality of reflective microstructures;

wherein said first and second pluralities of reflective microstructures are arranged in a plurality of rows on said substrate and said reflective microstructures within an outer one of said rows are elevatable to a greater height from the first surface of said substrate than said reflective microstructures within an inner one of said rows.

71. An optical cross connect for switching an optical signal between a first plurality of optical ports and a second plurality of optical ports, the first and second pluralities of optical ports comprising optical fiber ends, said optical cross connect comprising: a substrate having a first surface facing the first and second pluralities of optical ports;

a first plurality of reflective microstructures formed on the first surface of said substrate, each said reflective microstructure of said first plurality of reflective microstructures being associated with one of the first plurality of optical ports and including an optically reflective surface;

a second plurality of reflective microstructures formed on the first surface of said substrate, each said reflective microstructure of said second plurality of reflective microstructures being associated with one of the second plurality of optical ports and including an optically reflective surface;

each said reflective microstructure of said first plurality of reflective microstructures being positionable to orient its reflective surface to reflect an optical signal receivable from its associated optical port to the reflective surface of at least one of said reflective microstructures of said second plurality of reflective microstructures and to reflect an optical signal receivable from the reflective surface of at least one of said reflective microstructures of said second plurality of reflective microstructures to its associated optical port;

each said reflective microstructure of said second plurality of reflective microstructures being positionable to orient its reflective surface to reflect an optical signal receivable from the reflective surface of at least one of said reflective microstructures of said first plurality of reflective microstructures to its associated optical port and to reflect an optical signal receivable from its associated optical port to the reflective surface of at least one of said reflective microstructures of said first plurality of reflective microstructures;

a lid positionable between the optical ports and the first surface of said substrate, said lid being configured for permitting transmission of optical signals therethrough between each optical port and its associated reflective microstructure;

at least one plate attachable to said lid, said at least one plate including a plurality of holes within which the optical fiber ends are receivable formed on a side of said at least one plate facing away from the first surface of said substrate, the holes being arranged on said at least one plate to align the optical fiber ends with the reflective microstructures when said at least one plate is attached on said lid; and an alignment structure configured to ensure correct alignment of said at least one plate on said lid when attaching said at least one plate to said lid, wherein said alignment structure comprises at least one of a notch, a groove, and a pin formed on at least one of said lid and said plate.

72. An optical cross connect for switching an optical signal between a first plurality of optical ports and a second plurality of optical ports, said optical cross connect comprising:

a substrate having a first surface facing the first and second pluralities of optical ports;

a first plurality of reflective microstructures formed on the first surface of said substrate, each said reflective microstructure of said first plurality of reflective microstructures being associated with one of the first plurality of optical ports and including an optically reflective surface;

a second plurality of reflective microstructures formed on the first surface of said substrate, each said reflective microstructure of said second plurality of reflective microstructures being associated with one of the second plurality of optical ports and including an optically reflective surface; and an optically reflective area facing and spaced away from the first surface of said substrate, said optically reflective area being positioned between the first and second pluralities of optical ports to reflect an optical signal between the optically reflective surface of any one of said reflective microstructures of said first plurality of reflective microstructures and the optically reflective surface of any one of said reflective microstructures of said second plurality of reflective microstructures, wherein said optically reflective area is configured to modify optical properties of an optical signal reflected therefrom, said optical properties including polarization;

each said reflective microstructure of said first and second pluralities of reflective microstructures being positionable to orient its reflective surface to reflect an optical signal receivable from its associated optical port to the optically reflective area and to reflect an optical signal receivable from the optically reflective area to its associated optical port.

73. An optical cross connect switch, comprising:

a support;

a plurality of first input mirror microstructures disposed within a first row on a first side of a first reference axis;

a first pivot member for each of said input mirror microstructures, wherein each said first pivot member interconnects its corresponding said first input mirror microstructure with said support, and wherein each said first pivot members is of a first length;

a plurality of second input mirror microstructure disposed within a second row on said first side of said first reference axis in second relation to said first row such that said first row is disposed between second row and said first reference axis;

a second pivot member for each of said second input mirror microstructure, wherein each said second pivot member interconnects its corresponding said second input mirror microstructure with said support, and wherein each said pivot member is of a second length;

a plurality of first output mirror microstructure disposed within a third row on a second side of said first reference axis that is opposite said first side;

a third pivot member for each of said first output mirror microstructure, wherein each said third pivot member interconnects its corresponding said first output mirror microstructure with said support, and wherein each said third pivot member is of a third length;

a plurality of second output mirror microstructure disposed within a fourth row on said second side of said first reference axis in spaced relation to said third row such that said third row is disposed between said fourth row and said first reference axis; and a fourth pivot member for each of said second output mirror microstructure, wherein each said fourth pivot member interconnects its corresponding said second output mirror microstructure with said support, and wherein each said fourth pivot member is of a fourth length;

wherein said second length is greater than said first length and wherein said fourth length is greater than said third length.

74. An optical cross connect switch, comprising:

a support having a surface;

a plurality of first input mirror microstructures disposed within a first row on a first side of a first reference axis defined on the surface of said support;

a first pivot member for each of said input mirror microstructures, wherein each said first pivot member interconnects its corresponding said input mirror microstructure with said support, wherein said first input pivot members in said first row are disposed in non- parallel relation;

a plurality of output mirror microstructures disposed within a second row on a second side of said first reference axis that is opposite said first side; and a first output pivot member for each of said output mirror microstructures, wherein each said first output pivot member interconnects its corresponding said output mirror microstructure with said support, wherein said first output pivot members in said second row are disposed in non-parallel relation.

* * * * *

UNITED STATES PATENT AND TRADEMARK OFFICE
CERTIFICATE OF CORRECTION

PATENT NO. : 6,640,023 B2
DATED : October 28, 2003
INVENTOR(S) : Miller et al.

It is certified that error appears in the above-identified patent and that said Letters Patent is hereby corrected as shown below:

Column 28,
Line 5, delete the words "micro structures", and insert therefor -- microstructures --.

Column 30,
Lines 39, 45, 49, 53, 57 and 63, delete the word "microstructure", and insert therefor -- microstructures --;
Line 41, delete the word "second", and insert therefor -- spaced --;
Line 48, after the word "said", insert the word -- second --;

Signed and Sealed this

Twenty-seventh Day of January, 2004

JON W. DUDAS
*Acting Director of the United States Patent and Trademark Office*